(12) United States Patent
Spletzer

(10) Patent No.: US 7,188,535 B1
(45) Date of Patent: Mar. 13, 2007

(54) LOAD CELL HAVING STRAIN GAUGES OF ARBITRARY LOCATION

(75) Inventor: Barry Spletzer, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 61 days.

(21) Appl. No.: 11/152,761

(22) Filed: Jun. 13, 2005

(51) Int. Cl.
*G01L 1/22* (2006.01)

(52) U.S. Cl. .................. 73/862.041; 73/862.044; 177/211

(58) Field of Classification Search .................. 73/862.041–862.06; 177/211
See application file for complete search history.

(56) References Cited

U.S. PATENT DOCUMENTS

| | | | |
|---|---|---|---|
| 4,640,138 A * | 2/1987 | Meyer et al. | 73/862.045 |
| 5,850,044 A | 12/1998 | Spletzer | |
| 5,889,214 A * | 3/1999 | Kang et al. | 73/862.044 |
| 5,969,268 A * | 10/1999 | Sommerfeld et al. | 73/862.041 |
| 6,247,372 B1 | 6/2001 | Spletzer | |

OTHER PUBLICATIONS

Boresi et al., Advanced Mechanics of Materials, p. 95, 5th ed., Wiley and Sons, Inc., ISBN 0-471-55157-0.
Timoshenko et al., Theory of Elasticity, pp. 354,359, 3d ed., McGraw-Hill Book Co., ISBN 07-064720-8.

* cited by examiner

*Primary Examiner*—Randy W. Gibson
(74) *Attorney, Agent, or Firm*—Andrea L. Mays; William R. Conley

(57) ABSTRACT

A load cell utilizes a plurality of strain gauges mounted upon the load cell body such that there are six independent load-strain relations. Load is determined by applying the inverse of a load-strain sensitivity matrix to a measured strain vector. The sensitivity matrix is determined by performing a multivariate regression technique on a set of known loads correlated to the resulting strains. Temperature compensation is achieved by configuring the strain gauges as co-located orthogonal pairs.

17 Claims, 10 Drawing Sheets

Shear gauges at $\beta_\tau(+)$ and $-\beta_\tau(-)$

Axial (A) and transverse (T) gauges $+\beta_\tau(+)$ and $-\beta_\tau(-)$ gauges Axial (A) and transverse (T) gauges

LOAD CELL HAVING STRAIN GAUGES OF ARBITRARY LOCATION

GOVERNMENT RIGHTS

The load cell described herein was developed under Contract DE-AC04-94AL850000 between Sandia Corporation and the U.S. Department of Energy. The U.S. Government has certain rights in the invention.

BACKGROUND

1. Field

The present invention relates generally to the field of load cells, and more specifically to load cells with arbitrarily located strain gauges upon the load cell body.

2. Relevant Background

Load cells are used for measuring forces and moments along certain directions. Measurement of loads and moments about multiple axes can be beneficial in various research and manufacturing applications. Current multi-axis load cells, however, require complex machining and mechanical linkages to isolate loads along multiple axes. Loads that manifest only through shear stress at the load cell typically require especially complex machining or linkages for isolation. Current multi-axis load cells are consequently expensive to manufacture, and can be readily damaged by overloading. The frequency response of current load cells is also limited by the characteristics of the machining and mechanical linkages, precluding their use in applications with rapidly varying loads. Many applications that might benefit from multi-axis load measurements are thus precluded by the high cost of current multi-axis load cells.

Additionally, temperature compensation is one of the largest concerns in load cell design. The issue of temperature compensation can be especially important when semiconductor strain gauges are used to enhance sensitivity.

There is a need for a multi-axis load cell that is simple and inexpensive to manufacture, rugged, and achieves temperature compensation.

SUMMARY

The load cell described herein includes a body adapted for receiving a load, and strain gauges mounted upon the body such that there are six independent load-strain relations. Processing means in communication with the strain gauge outputs include a computer readable medium tangibly embodying at least one set of instructions to decouple load-strain relations. A decoupling coefficient matrix is generated by performing multivariate linear regression on a set of applied loads correlated to the resulting strains. The inverse of the coefficient matrix is applied to a measured strain vector to determine load components. The strain gauges can also be configured to achieve temperature compensation, such as by configuring the gauges as co-located orthogonal pairs.

The method of designing a load cell described herein includes providing a body adapted for receiving a load, mounting a plurality of strain gauges upon the body such that the resulting load-strain relations are linearly independent, applying a known load to the body, and calibrating the load cell by gathering load-strain data and developing a sensitivity matrix for the load cell. The method optionally includes compensating for temperature, such as by co-locating orthogonal pairs of strain gauges.

The method of determining load using a load cell described herein includes providing a body adapted for receiving a load, mounting strain gauges upon the body such that there are six independent load-strain relations, applying a load to the load cell, and mathematically decoupling load-strain relations. Decoupling can be accomplished by applying the inverse of a coefficient matrix to a measured strain vector. The coefficient matrix is generated by performing a multivariate regression technique on load-strain relations. The method of determining load optionally further includes compensating for temperature, such as by co-locating orthogonal pairs of strain gauges.

A computer readable medium described herein tangibly embodies at least one set of instructions to perform the steps of gathering load-strain data from a load cell, and developing a load-strain sensitivity matrix for the load cell. The medium can further determine a load applied to the load cell by applying the inverse of the load-strain sensitivity matrix to a measured strain vector. The load-strain sensitivity matrix is preferably a coefficient matrix generated by performing a multivariate regression technique on a set of applied loads correlated to resulting strains.

Advantageously, the load cell is rugged yet provides good resolution, and is relatively inexpensive to manufacture. The use of a plurality of gauges and a multivariate regression technique produces a load cell that is more reliable and accurate than earlier designs. The calibration procedure used in designing the load cell allows for arbitrary strain gauge placement. The load cell can also be configured to achieve temperature compensation.

DRAWINGS

Information pertaining to the disclosed load cell is shown in the following figures, in which like reference numbers and designations indicate like or similar parts.

Figure 8B:
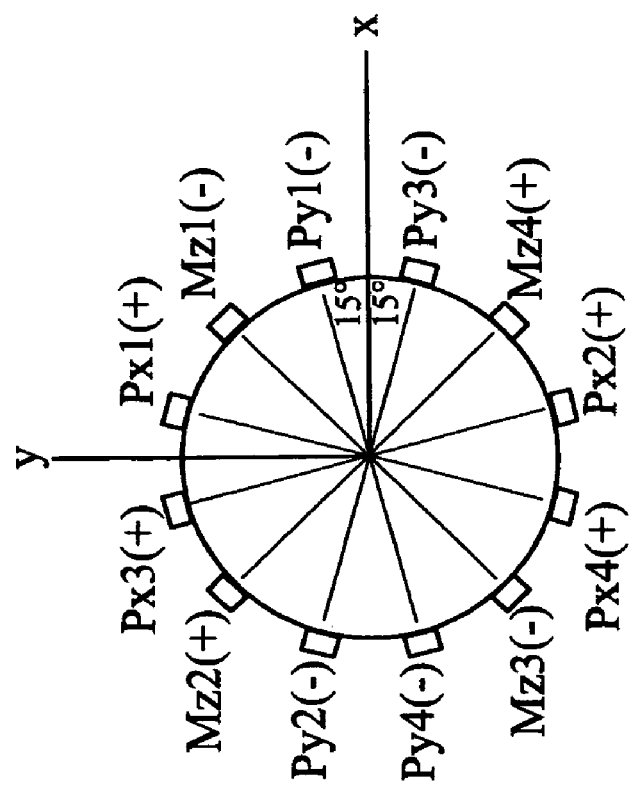
Figure 8A:
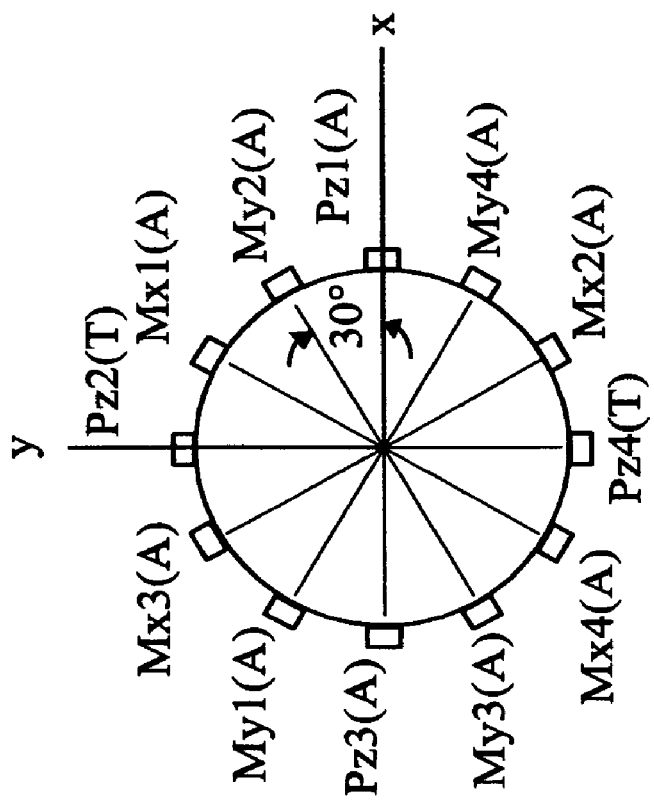
Figure 9:
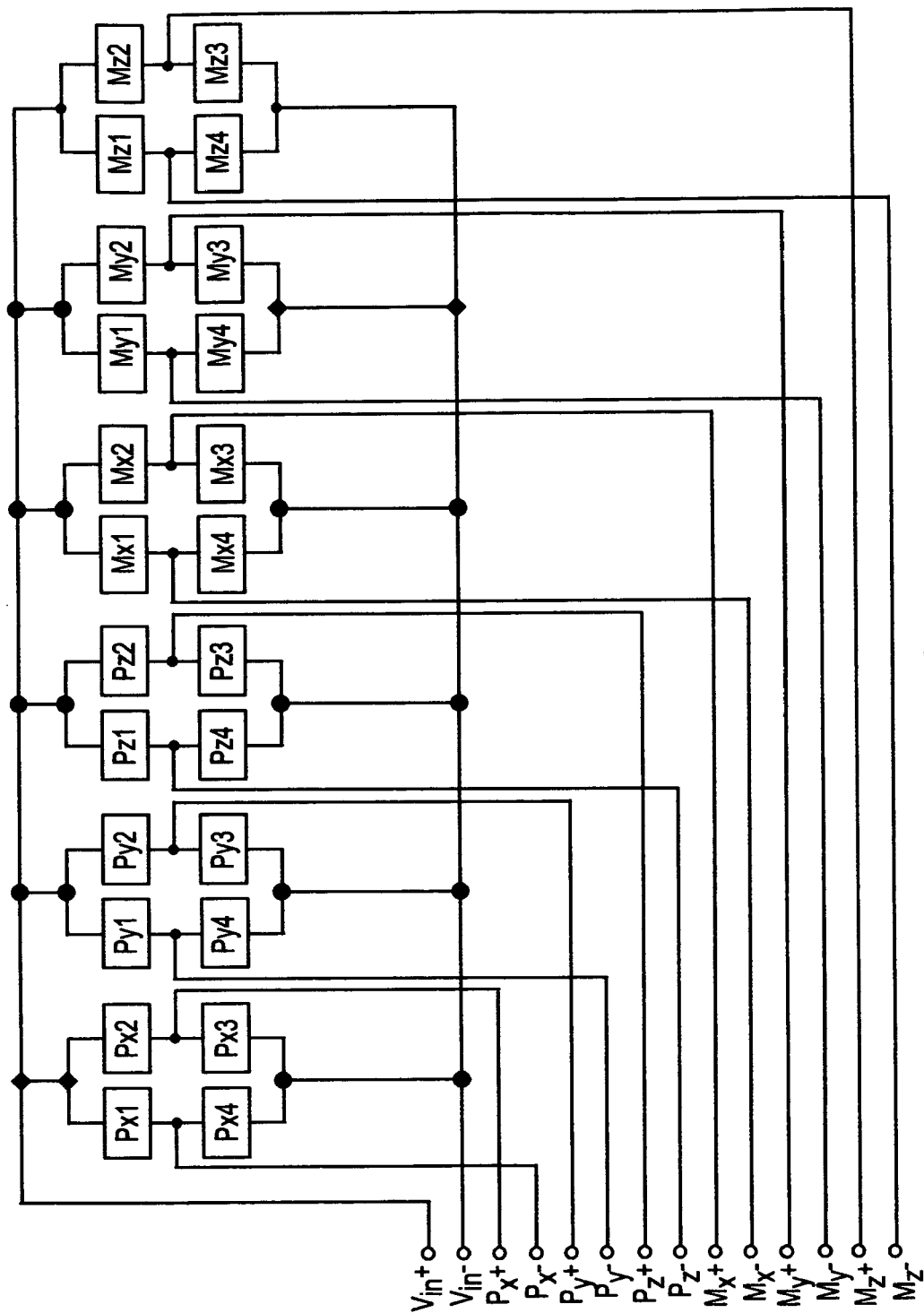
Figure 10B:
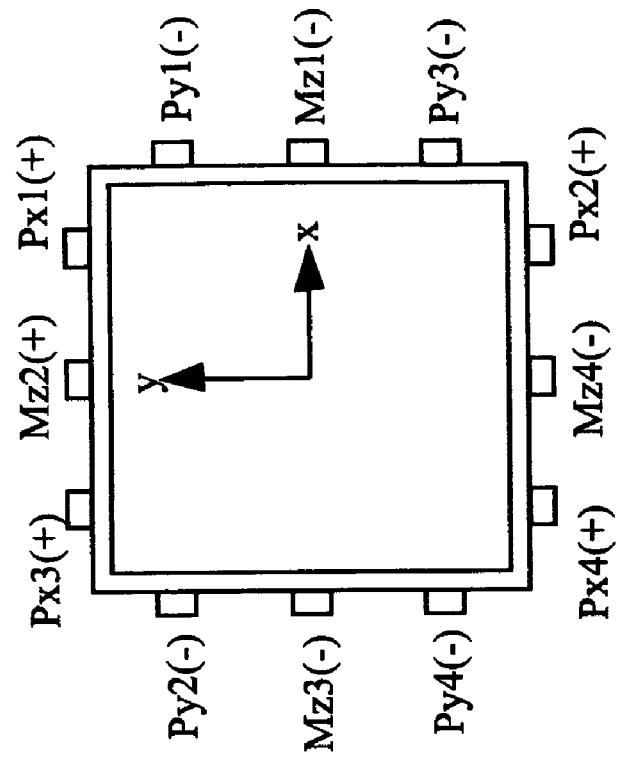
Figure 10A:
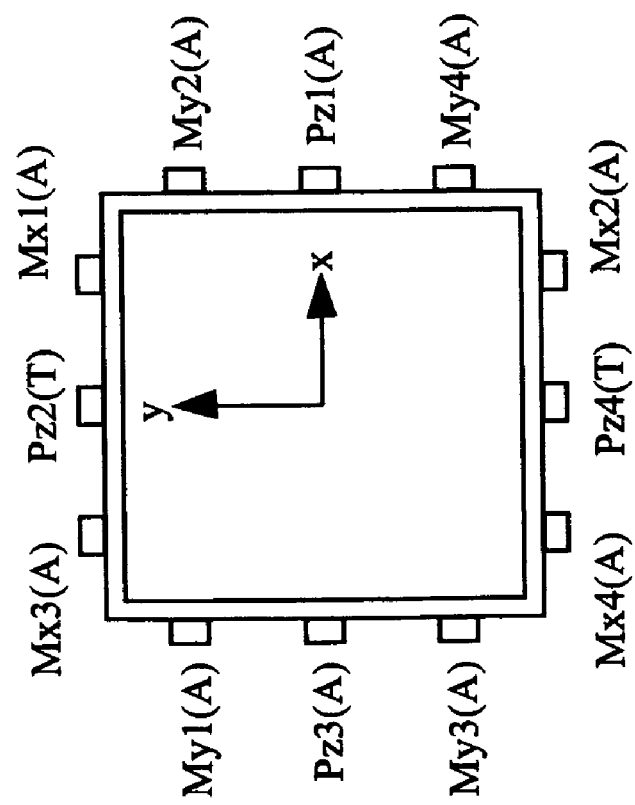

FIG. 8*a* illustrates example axial and transverse gauge locations for an annular six-axis load cell;

FIG. 8*b* illustrates example shear gauge locations for an annular six-axis load cell;

FIG. 9 illustrates an electrical schematic for a six-axis load cell;

FIG. 10*a* illustrates example axial and transverse gauge placement for a six-axis square cross-section load cell; and FIG. 10*b* illustrates example shear gauge placement for a six-axis square cross-section load cell.

DETAILED DESCRIPTION

The terms "computer", "processor", or "processing means" are used herein to refer generally to a programmable apparatus or terminal in communication with a programmable apparatus, having a processor or other equivalent hardware, as well known by those skilled in the art. Each "computer", "processor", or "processing means" referred to herein includes the necessary "computer-readable" media to perform the functions or methods described herein, or is in communication with the necessary computer-readable media. The phrase "in communication with" as it is used herein refers to a coupling between system elements wherein information is transmittable from one element to the other, whether such information is communicated directly, or via other system elements.

The term "computer-readable medium" refers to any medium that participates in providing instructions to a processor for execution. As used herein, the term "code" and/or "software" refers to a set of instructions that are communicated to a processor. "Computer readable media" may take many forms, including but not limited to, "non-volatile media", "volatile media", and "transmission media". "Non-volatile media" includes, for example, optical or magnetic disks such as used for a storage medium. "Volatile media" includes dynamic memory. Common forms of "computer-readable media" include floppy disks, flexible disks, hard disks, magnetic tape, other magnetic mediums, CD-ROM or other optical medium, RAM, PROM, EPROM, FLASH EPROM, and other memory chips or cartridges, a carrier wave, or any medium from which a computer or processor, as those terms are known to those skilled in the art, can read. Databases, data, and/or records can be recorded or stored on computer readable media.

A simple six-axis load cell is described herein based on instrumentation of an annulus with strain gauges. The design is rugged yet provides good resolution and is relatively inexpensive to manufacture.

The strain gauges need not be individual strain gauges. Half bridges and even full bridges can be used to provide the necessary minimum of six outputs. A full bridge approach is particularly attractive to produce a temperature compensated load cell. Typically, temperature compensation is one of the largest concerns in load cell design. By using co-located orthogonal pairs of gauges rather than individual gauges, temperature compensation becomes inherent in the design. When attached as adjacent arms in a bridge, the co-located gauges exhibit common mode rejection thus providing excellent temperature compensation.

When only six gauges are used on a load cell, a simple matrix inversion is used to extract the unique set of six applied loads that will produce the measured strains at the six gauge locations. However, while only six gauges are required to produce a fully functional load cell, additional gauges may be added. Data from additional gauges results in an over defined system of equations. When additional gauges are used, the data may be analyzed using a multivariate regression technique, such as linear regression, or least squares, or nonlinear regression to determine a best estimate of the applied loads. The use of redundant gauges and a multivariate regression technique produces a load cell that is more reliable and accurate than earlier designs.

The load cell described herein provides improvements to a simplified six-axis load cell by allowing for redundant gauges and providing a way to achieve temperature compensation. The underlying theory of load cell design, general constraints followed, and the resulting sensitivity of a load cell are described herein.

Figure 1:
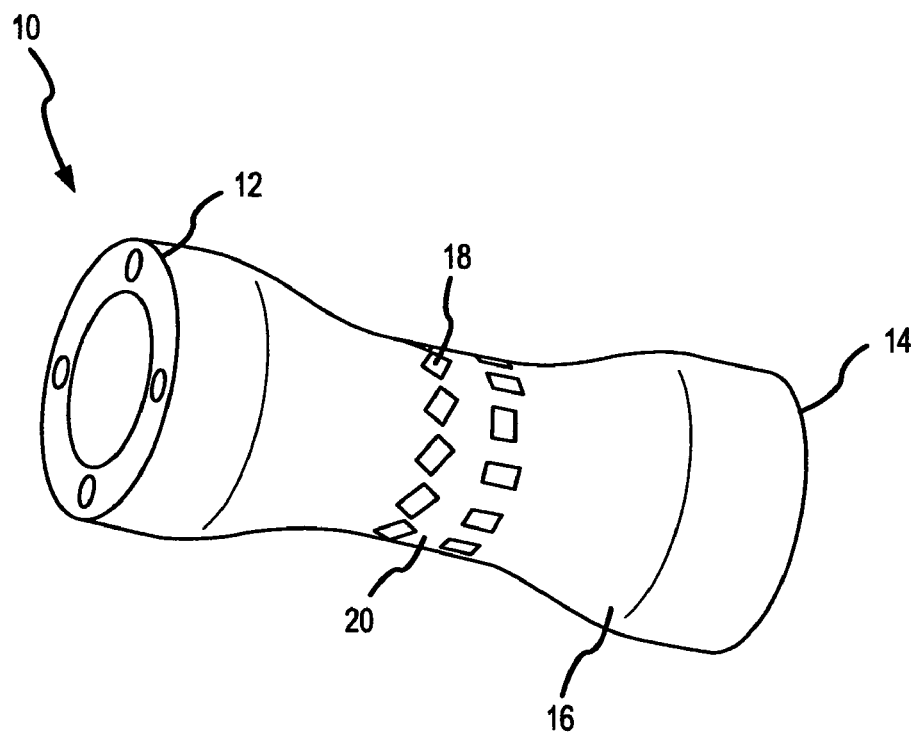
FIG. 1 illustrates a six-axis load cell.

A perspective side view of an example six-axis load cell is shown in FIG. 1. Referring to FIG. 1, the load cell 10 is a simple tubular body consisting of two concentric thickened ends 12, 14 with varying but generous radii 16. These ends 12, 14 are suitable to apply the loads. A number of strain gauges 18 are placed on an annular middle section 20 of smaller radius.

The governing stress-strain relationships of the load cell can be derived by considering an annular segment subjected to generalized end loading conditions of both applied force and moment. The derivation presented here is valid for a circular annulus. Extensions of these results to other prismatic shapes are discussed later. On the inner or outer surface the material is in a state of plane stress. In cylindrical coordinates this implies that:

$$\sigma_r = \tau_{r\theta} = \tau_{rz} = 0. \quad (1)$$

Using Saint-Venant's semi-inverse technique, it can be shown that for generalized end loading of an annulus:

$$\sigma_\theta = \sigma_r = 0. \quad (2)$$

This leaves only two nonzero stress components ($\sigma_z$ and $\tau_{\theta z}$), which will be referred to as $\sigma$ and $\tau$. To determine the stresses from the measured strains, and from there the applied loads, a relationship is developed between axial strain (that measured by a single element strain gauge) and applied stress.

Figure 2:
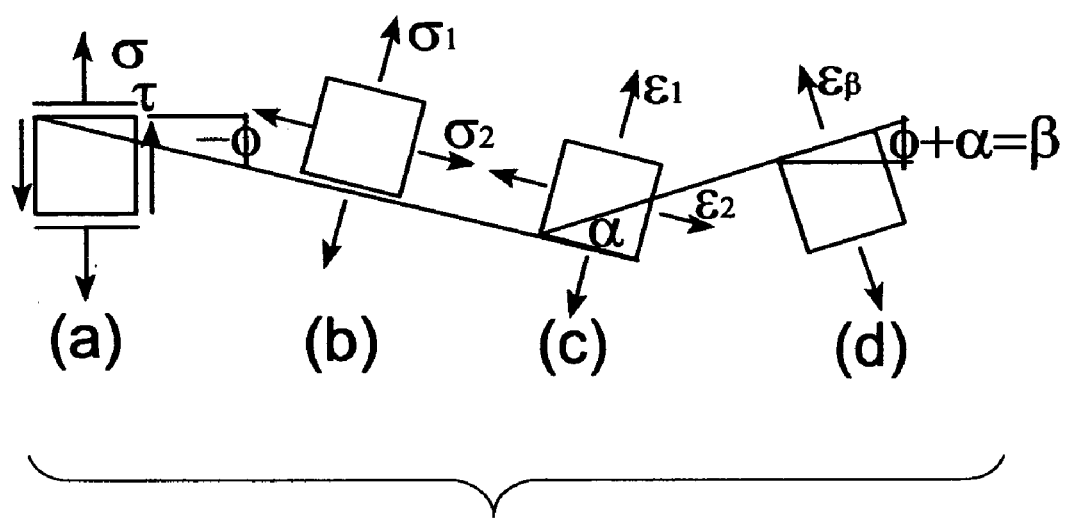
FIG. 2 illustrates the geometric relationships between (a) applied stress, (b) principal stresses, (c) principal strains and (d) axial strain at a general location.

FIG. 2 illustrates the geometric relationships between (a) the applied stress, (b) the principal stresses, (c) the principal strains, and (d) axial strain at a general location. Beginning with the applied stresses ($\sigma$ and $\tau$), both the principal stresses ($\sigma_1$ and $\sigma_2$) and the direction of the principal stresses relative to the applied stress can be determined by Mohr's Circle. The angle $\phi$ is defined as the counterclockwise angle from the $\sigma$ axis to the maximum principal stress ($\sigma_1$) axis. The Mohr's circle diagram for this is shown in FIG. 3.

Figure 3:
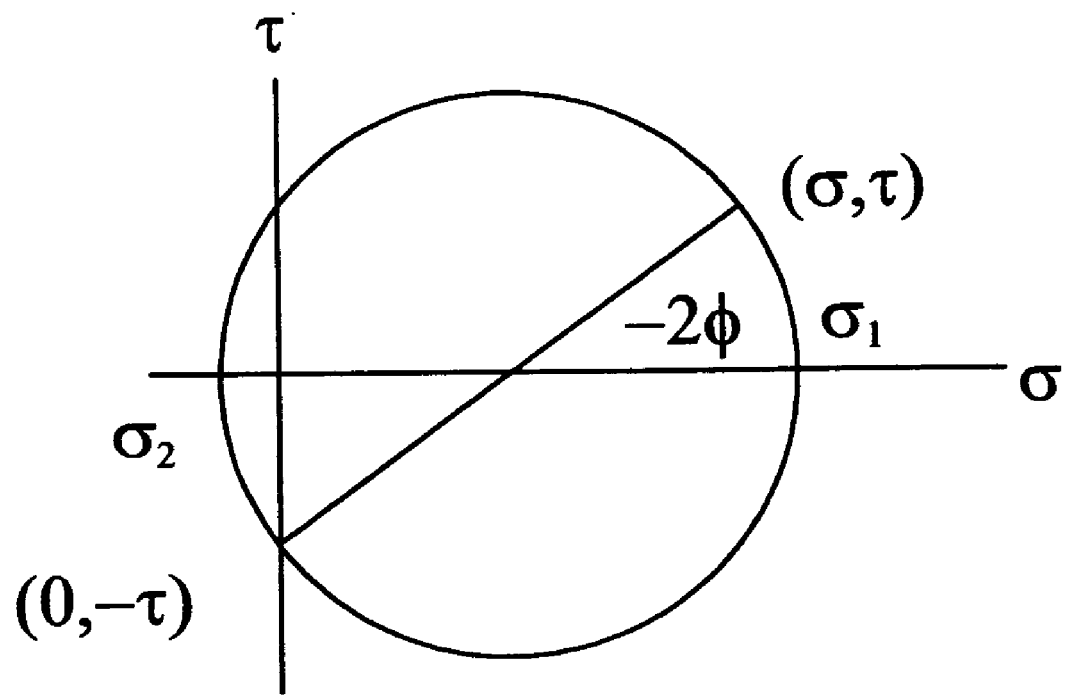
FIG. 3 illustrates Mohr's stress circle for a typical surface element.

From FIG. 3, expressions for the principal stresses and the angle $\phi$ are:

$$\sigma_1 = \frac{\sigma}{2}[1 + \sec(2\phi)], \quad (3)$$

$$\sigma_2 = \frac{\sigma}{2}[1 - \sec(2\phi)], \text{ and} \quad (4)$$

$$\phi = -\frac{1}{2}\arctan\left(\frac{2\tau}{\sigma}\right). \quad (5)$$

Where the arc tangent in equation (5) must consider the signs of the numerator and denominator (yield values from $-\pi$ to $\pi$). Otherwise the principal axes will be exchanged. Assuming an isotropic material, the principal stress and strain axes coincide. Based on plane stress, the principal strains ($\epsilon_1$ and $\epsilon_2$) are:

$$\varepsilon_1 = \frac{1}{E}(\sigma_1 = v\sigma_2) \quad (6)$$

$$\varepsilon_2 = \frac{1}{E}(\sigma_2 - v\sigma_1) \quad (7)$$

Substituting the principal stress relations (3), (4), and (5) into the principal strain relations (6) and (7) yields:

$$\varepsilon_1 = \frac{\sigma}{2E}[(1-v) + (1+v)\sec(2\phi)] \quad (8)$$

$$\varepsilon_2 = \frac{\sigma}{2E}[(1-v) - (1+v)\sec(2\phi)]. \quad (9)$$

Figure 4:
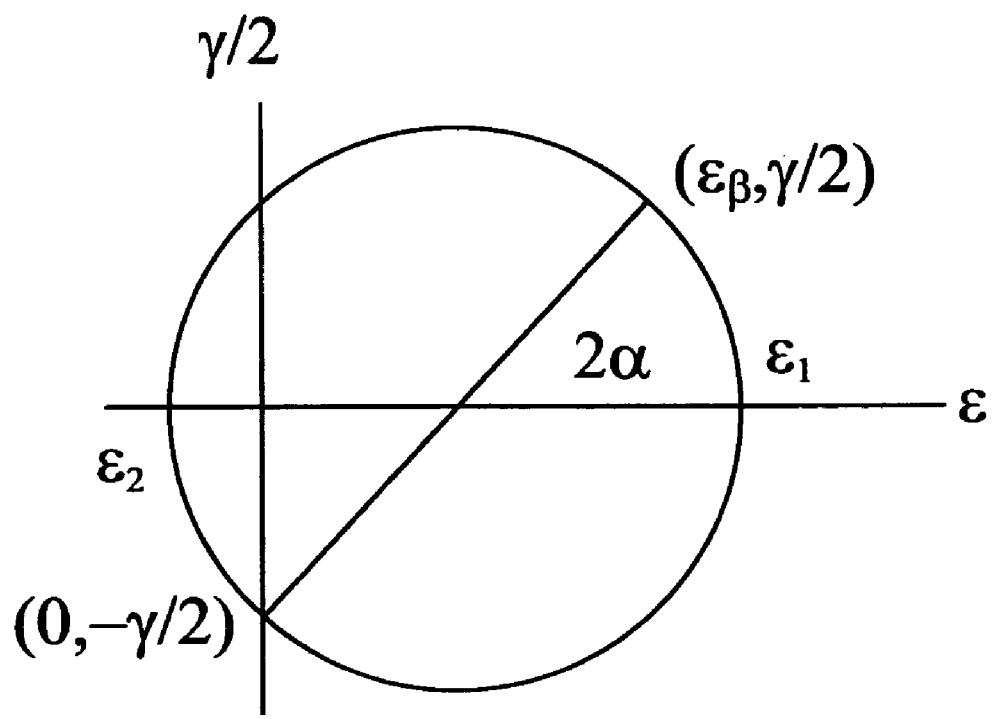
FIG. 4 illustrates Mohr's strain circle for a typical surface element.

The relationship between the principal strains and any general axial strain can be derived through Mohr's strain circle shown in FIG. 4. The shearing strain ($\gamma$) shown here will not be considered further since it does not contribute to the axial strain measured by strain gauges. The angle $\alpha$ is measured counterclockwise from the maximum principal axis ($\epsilon 1$) to the direction where the strain ($\epsilon_\beta$) is measured. The resulting relationship between principal stress and $\epsilon_\beta$ is:

$$\varepsilon_\beta = \frac{\varepsilon_1 + \varepsilon_2}{2} + \frac{\varepsilon_1 - \varepsilon_2}{2}\cos(2\alpha). \tag{10}$$

Substituting the relations between principal strain and applied stress (8 and 9):

$$\varepsilon_\beta = \frac{\sigma}{2E}[(1-v) + (1+v)\cos(2\alpha)\sec(2\phi)]. \tag{11}$$

Since $\phi$ and $\alpha$ are measured in the same direction, the direction of the measured strain ($\beta$) measured counterclockwise relative to the applied stress axes is:

$$\beta = \phi + \alpha. \tag{12}$$

In general, $\beta$ is known since it is determined by the placement of the gauge. The angles $\phi$ and $\alpha$ are both functions of the applied stresses and are not generally known. Combining equations (5), (11), and (12), the strain can be expressed in terms of $\beta$, $\sigma$, and $\tau$ only:

$$\varepsilon_\beta = \frac{\sigma}{2E}[(1-v) + (1+v)\cos(2\beta - 2\phi)\sec(2\phi)] \tag{13}$$

$$\varepsilon_\beta = \frac{\sigma}{2E}[(1-v) + (1+v)(\cos(2\beta) + \sin(2\beta)\tan(2\phi))]$$

$$\varepsilon_\beta = \frac{\sigma}{2E}\left[(1-v) + (1+v)\left(\cos(2\beta) - \frac{2\tau}{\sigma}\sin(2\beta)\right)\right]$$

$$\varepsilon_\beta = \frac{\sigma}{2E}[(1-v) + (1+v)\cos(2\beta)] - \frac{\tau}{E}(1+v)\sin(2\beta)$$

This equation is the general relationship between stress and strain for an end loaded annulus with gauges oriented at any angle $\beta$ to the annulus axis.

With the stress-strain relations determined, it is necessary to determine the load-stress relationships so that the two can be combined to produce the relations between load and strain. The load-strain relations can then be used to determine what strain measurements are needed to determine the individual components of the load.

Consider the contribution of the six load components to shear and axial stresses. A generalized loading consists of a force vector (P) made up of three components ($P_x$, $P_y$, and $P_z$), and a moment vector (M) also with three components ($M_x$, $M_y$, and $M_z$). The goal of the load cell design is to develop six analog voltage output signals each proportional to one of the load components and insensitive to all other loading. Since the annulus naturally conforms to a cylindrical coordinate system and the loads are in Cartesian coordinates, a relationship between the two systems is needed.

Figure 5:
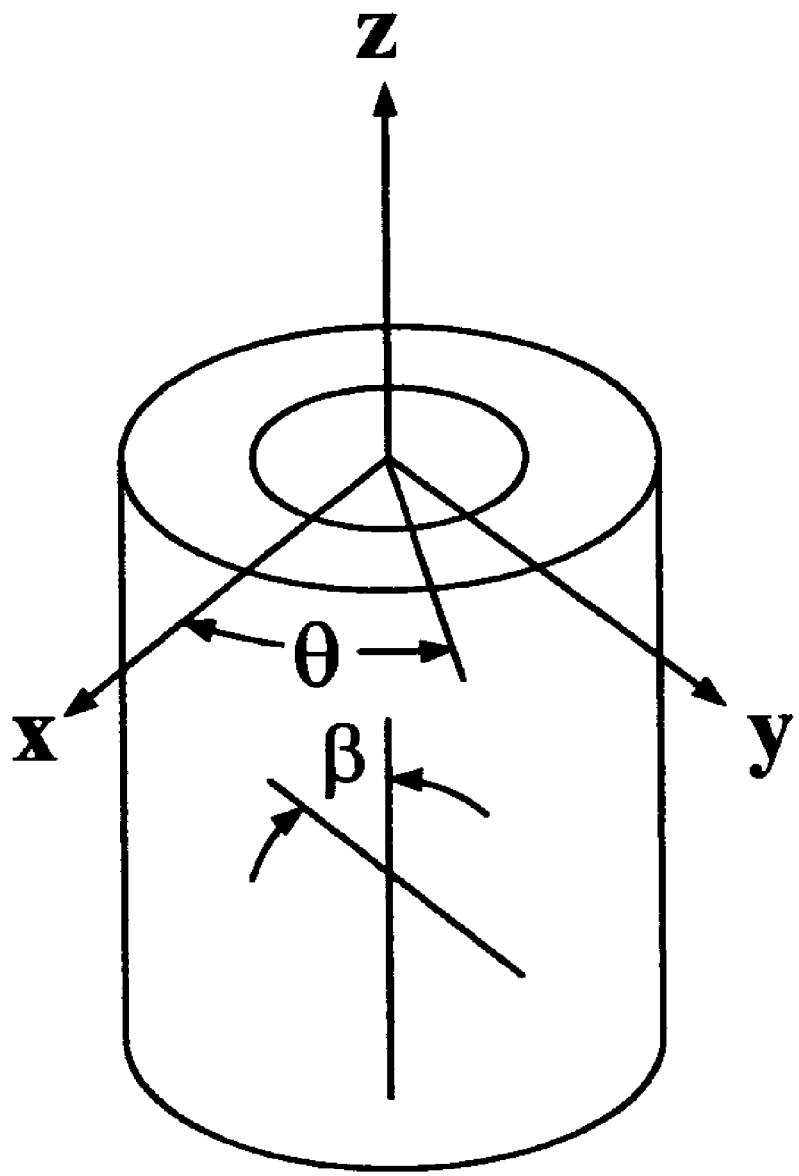
FIG. 5 illustrates a coordinate system for strain measurement.

FIG. 5 shows the coordinate system used for the annulus. The azimuth ($\theta$) is measured from the positive x axis towards the positive y axis. The direction at which the strain is measured, or the gauge angle ($\beta$), is measured counterclockwise from the axis of the azimuth as viewed from the outside.

The contribution to the total axial and shear stresses from each of the load components is needed. Since all relations are linear, simple addition of the individual stress contributions will yield expressions for the overall stresses. Each of the individual components is discussed below. Appropriate subscripts are used to identify the various stress components.

The axial load ($P_z$) produces a uniform axial stress of:

$$\sigma_{Pz} = \frac{P_z}{A} \tag{14}$$

where A is the cross-sectional area of the annulus.

$$A = \frac{\pi}{4}(D^2 - d^2) \tag{15}$$

The torsional load ($M_z$) produces pure shear of:

$$\tau_M = \frac{M_z r}{J} \tag{16}$$

Where r is the radius at which the stress is measured and J is the polar moment of inertia of the annular cross-section, defined as:

$$J = \int_{d/2}^{D/2} 2\pi r^3 \, dr = \pi\frac{(D^4 - d^4)}{32} \tag{17}$$

The remaining moment components produce pure bending stress about the x and y axes. The resulting stress distribution, unlike the z-axis moment, is a function of the azimuth ($\theta$). Using a right-handed rule convention, the bending stresses are:

$$\sigma_{Mx} = \frac{M_x r \sin\theta}{I} \tag{18}$$

$$\sigma_{My} = -\frac{M_y r \cos\theta}{I} \tag{19}$$

Where I is the moment of inertia about the centroid of the annular cross-section, defined as:

$$I = \int_0^{2\pi}\int_{d/2}^{D/2} r^3(\sin^2\theta) \, dr \, d\theta = \pi\frac{(D^4 - d^4)}{64} \tag{20}$$

Transverse shear presents a problem regarding the sign convention for shear stress. In general, no uniform sign convention exists to combine transverse shear stress with shear stress produced by torsion. However, since only a relationship between axial strain and applied load is needed, any convention that produces a consistent result for both transverse shear and torque can be used. Here, a positive shear stress will be defined as that produced by a positive torque about the axis of the annulus. The transverse shear stress at any location can be determined by resolving the contributing loads ($P_x$ and $P_y$) into a single vector acting perpendicular to the diameter where the shear stress is being determined. This avoids the problem of developing a sign convention to apply to the first moment of area (instead, the sign convention is maintained by the vector components of the load). Using this convention, the total transverse shear stress is:

$$\tau_P = \frac{(-P_x \sin\theta + P_y \cos\theta) Q_{max}}{I(D-d)} \qquad (21)$$

This relation is based on elementary beam theory, which assumes that the shear stress is constant through the thickness of the body. For a thin walled annulus this is a very good assumption. However, in the limiting case of a solid cylinder, this can result in errors of up to 4%. For this reason, a load cell with a thin wall annular design should be used to obtain greatest accuracy. Where $Q_{max}$ is the maximum first moment of area of the annulus defined by:

$$Q_{max} = \int_0^\pi \int_{d/2}^{D/2} r^2 (\sin\theta) \, dr \, d\theta = \frac{(D^3 - d^3)}{12} \qquad (22)$$

The total axial stress is determined by summing the contributing components discussed above in equations (14), (18), and (19), resulting in:

$$\sigma = \sigma_{Mx} + \sigma_{My} + \sigma_{Pz} = \frac{M_x r \sin\theta}{I} - \frac{M_y r \cos\theta}{I} + \frac{P_z}{A} \qquad (23)$$

Likewise, the shear stress is determined by combining equations (16) and (21):

$$\tau = \tau_P + \tau_M = -\frac{P_x Q_{max} \sin\theta}{I(D-d)} + \frac{P_y Q_{max} \cos\theta}{I(D-d)} + \frac{M_z r}{J} \qquad (24)$$

These two relations, (23) and (24), can be combined with the general stress-strain relation of equation (13) to produce the final load-strain relationship:

$$\varepsilon = \left(\frac{M_x r \sin\theta - M_y r \cos\theta}{2EI} + \frac{P_z}{2EA}\right)[(1-v) + (1+v)\cos(2\beta)] + \left(\frac{(P_x \sin\theta - P_y \cos\theta) Q_{max}}{EI(D-d)} + \frac{M_z r}{EJ}\right)(1+v)\sin(2\beta) \qquad (25)$$

This shows that a linear relationship exists between load and strain where, in general, all six components of the load contribute to the total strain and each of the proportionality constants are, in general, unique and are a function of gauge placement. It follows directly from this that the six components of load ($P_x$, $P_y$, $P_z$, $M_x$, $M_y$, $M_z$) can be determined from six independent strain measurements ($\varepsilon_1$ through $\varepsilon_6$) made at six orientations ($\beta_1$ through $\beta_6$) and six azimuth angles ($\theta_1$ through $\theta_6$) on the surface of the annulus. The only restriction is that all the resulting load-strain equations be linearly independent. A load cell devised this way will produce six strain measurements with each strain coupled to all six of the load components. A specific load cell design will have a constant 6×6 coefficient matrix coupling the strains to the loads. The load components are then determined by multiplying the inverse of the coefficient matrix by the vector composed of the measured strains.

While this design could produce a workable six-axis load cell, careful selection of the strain gauge orientation and azimuth significantly simplifies the load-strain relation.

The discussion above showed that any six strain measurements could be used to determine the six load components. However, the coupling of the resulting equations requires a full solution to six simultaneous equations to determine the six components. In addition to being mathematically cumbersome, it is difficult to determine the amount of precision obtainable and the relative sensitivity of the system to load changes. By carefully selecting the gauge locations, the six equations can be largely uncoupled resulting in a much more useful load cell.

Equation (13) shows that the axial stress ($\sigma$) is a function of the cosine of the gauge orientation ($\beta$) while shear stress ($\tau$) is a function of the sine. This means that the gauge orientation could be used to place gauges that are sensitive to only the shear or axial stress. Further, equations (23) and (24) show that the axial and shear stress are each a function of only three of the applied loads. This means that gauges sensitive to only axial or shear stress is insensitive to three of the six load components. Therefore, by placing gauges so that they are sensitive to only axial or shear stress, but not to both, the original set of six simultaneous equations is reduced to two sets of three equations each.

From equation (13), sensitivity to axial stress only can be achieved by positioning the gauges such that $\sin(2\beta)=0$, or at angles that are multiples of $\pi/2$. This yields two distinct orientations that are insensitive to shear stress ($\beta=0$, $\beta=\pi/2$). One orientation is aligned with the annulus axis, the other is perpendicular to it. Equation (13) also indicates that gauge orientations exist where the strain is a function of shear stress only and independent of axial stress. These values of $\beta$ are those where:

$$(1-v) + (1+v)\cos(2\beta) = 0 \text{ or} \qquad (26)$$

$$\beta = n\pi \pm \frac{1}{2}\arccos\left(\frac{v-1}{v+1}\right) \qquad (27)$$

As with axial stresses, this reduces to two distinct orientations:

$$\beta_\tau = \pm \frac{1}{2}\arccos\left(\frac{v-1}{v+1}\right) \qquad (28)$$

The notation $\beta_\tau$ is used here to indicate the gauge orientation sensitive to shear only. This angle is a function of Poisson's ratio only. Typical values for $\beta_\tau$ are about 1 radian. For axial and transverse gauge placement the relation between measured strain and axial stress reduces (as expected) to:

$$\varepsilon_0 = \frac{\sigma}{E} \qquad (29)$$

$$\varepsilon_{\pi/2} = \frac{-v\sigma}{E} \qquad (30)$$

where the subscript on $\varepsilon$ indicates the gauge orientation relative to the axis of the annulus. Substituting equation (14) into equation (13) yields the relation between shear stress and axial strain for gauges at $\pm\beta_\tau$:

$$\varepsilon_{\pm\beta_\tau} = \mp \frac{2\tau\sqrt{\nu}}{E} \quad (31)$$

The sign convention shown here can be determined by inspection, keeping in mind the conventions previously discussed for β and τ.

Figure 6:
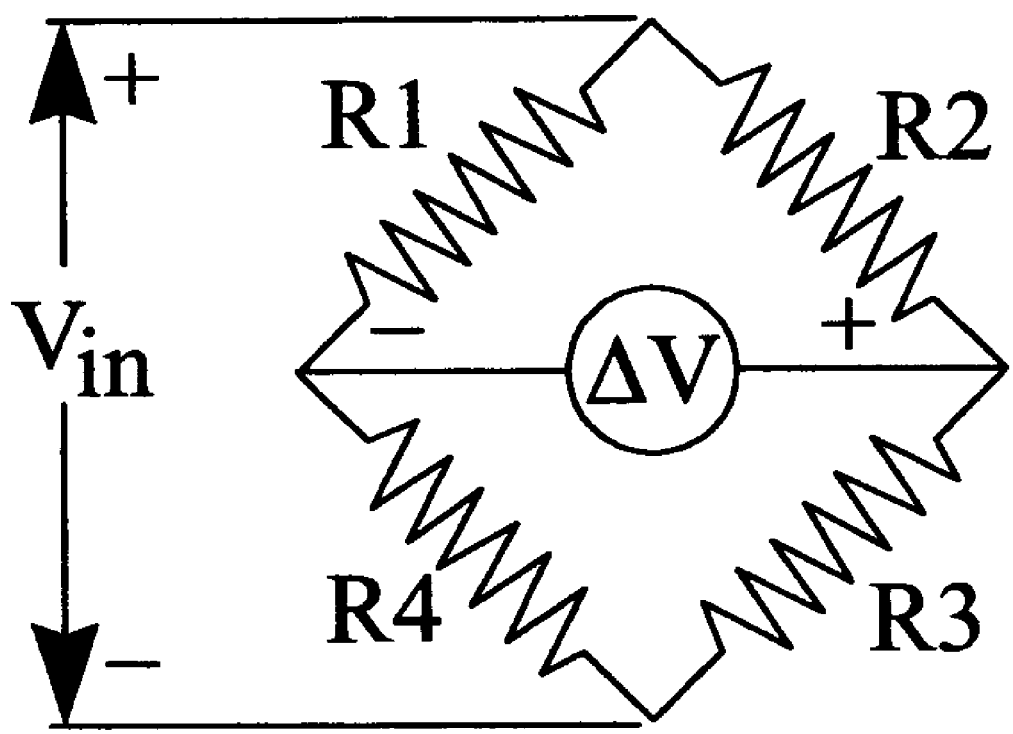
FIG. 6 illustrates an electrical schematic of a four-arm Wheatstone bridge.

Using resistance strain gauges, (either foil or semiconductor) combinations of four strain measurements can be combined using a four active arm Wheatstone bridge shown in FIG. 6. In FIG. 6 the polarity indicated is for tension in gauges 1 and 3 and compression in gauges 2 and 4.

The relationship between applied strain ($\epsilon$), gauge resistance (R), gauge factor (F), and change in gauge resistance is:

$$\frac{\Delta R}{R} = F\varepsilon \quad (32)$$

By combining four active strain gauges experiencing strains $\epsilon_1$ through $\epsilon_4$ the resulting voltage output ($\Delta V$) as a function of the bridge voltage (V) and the gauge factor (F) is:

$$\Delta V = \frac{VF}{4}(\varepsilon_1 - \varepsilon_2 + \varepsilon_3 - \varepsilon_4) \quad (33)$$

Now, using the values of β previously shown to separate axial stress from shear stress, values of azimuth (θ) may be chosen to produce four-arm bridges with each bridge sensitive to only one of the six load components. Specifically, β=0 and β=π/2 are used to measure axial stress and β=±β$_\tau$ are used for shear stress. In order to do this for a general case, a generalized four-arm bridge equation may be constructed. The form of this equation results from 1) equation (33) which is the sum of the four gauge contributions, 2) equation (13) which showed that gauges placed at the appropriate β angles produce signals directly proportional to either axial or shear stress separately, and 3) equation (23) and (24) which showed that the axial and shear stress are each linear functions of three load components with coefficients that are simple trigonometric functions of the azimuth. The resulting generalized bridge output equation has the form:

$$Y = \sum_{i=1}^{4} (-1)^{i+1} K_i (A\sin\theta_i + B\cos\theta_i + C) \quad (34)$$

where Y is the normalized bridge output ($4\Delta V/VF$), $K_i$ are the stress-strain coefficients (a function of β), i is the gauge number, and the term in parentheses is the stress at location $\theta_i$. As will be discussed, there are only two acceptable values of K (referred to as $K_A$ and $K_B$) for either axial or shear stress. The K value is determined by the β angle of the gauge from equation (13). Decoupling of axial and shear components limits the allowable values for β. The values of A, B and C are the coefficients from the stress-load equations. Specifically, for axial stresses:

$$K_{\beta=0} = \frac{1}{E} K_{\beta=\pi/2} = -\frac{\nu}{E} \quad (35)$$

$$A = \frac{M_x r}{I} \quad B = -\frac{M_y r}{I} \quad C = \frac{P_z}{A} \quad (36)$$

For shear stresses:

$$K_{\beta=-\beta_\tau} = \frac{2\sqrt{\nu}}{E} \quad K_{\beta=\beta_\tau} = -\frac{2\sqrt{\nu}}{E} \quad (37)$$

$$A = -\frac{P_x Q_{max}}{I(D-d)} \quad B = -\frac{P_y Q_{max}}{I(D-d)} \quad C = \frac{M_z D}{2J} \quad (38)$$

Since the form of the bridge output equation is identical, gauge placement strategies sensitive to only A, only B, and only C (and therefore sensitive to a single load component) can be used for both axial and shear stresses. These placement strategies will produce gauge bridges sensitive to each of the six load components.

Since there are only two unique values of K, insensitivity to C requires:

$K_1 = K_2$ and $K_3 = K_4$ or $K_1 = K_4$ and $K_2 = K_3$ \quad (39)

Since the assignment of gauge numbers to physical locations is arbitrary, the two sets of constraints are actually only a single constraint with different gauge numbering convention. Therefore, only the first form of the constraint need be considered.

For a bridge to exhibit sensitivity to C, both allowable values of K are needed (using only a single K value makes the bridge insensitive to C by satisfying the equation (39) constraint). Using both values and avoiding the insensitivity condition (39) leads to:

$K_1 = K_3 = K_A$  $K_2 = K_4 = K_B$  $K_A \neq K_B$ \quad (40)

Incorporating the above constraints into equation (34) results in a relation for the normalized output of any bridge sensitive to C is:

$Y = K_A(A(\sin\theta_1 + \sin\theta_3) + B(\cos\theta_1 + \cos\theta_3) + 2C) - K_B(A(\sin\theta_2 + \sin\theta_4) + B(\cos\theta_2 + \cos\theta_4) + 2C)$ \quad (41)

If the bridge is to be sensitive to only C, the following must also be satisfied:

$K_A(\sin\theta_1 + \sin\theta_3) = K_B(\sin\theta_2 + \sin\theta_4)$ \quad (42)

and $K_A(\cos\theta_1 + \cos\theta_3) = K_B(\cos\theta_2 + \cos\theta_4)$ \quad (43)

For general values of $K_A$ and $K_B$ this requires that the trigonometric terms on each side of equations (42) and (43) sum to zero (other conditions exist for specific K values).

For equation (43):

$\theta_{i+2} = \pm\theta_i \pm \pi$ \quad (44)

For equation (42), the relation is similar with a $\pi/2$ shift:

$$\theta_{i+2} - \frac{\pi}{2} = \pm\left(\theta_i - \frac{\pi}{2}\right) \pm \pi. \qquad (45)$$

Since only one set of azimuth values can be chosen for a bridge, and $+\pi$ and $-\pi$ are equivalent positions relative to any chosen $\theta$, the only acceptable set of values that satisfies both conditions is:

$$\theta_{i+2} = \theta_i + \pi \qquad (46)$$

This is the only acceptable relative positioning of the gauges for axial and torsional loads (sensitivity to C) for independent $K_A$ and $K_B$ (other solutions are possible by examining the relationships between the two allowable values of K). Further, $K_A$ cannot equal $K_B$; if they are equal, sensitivity to C also disappears. The absolute positioning of the gauges in azimuth is unimportant. The only positioning requirement is that the elements of a gauge pair consisting of opposite arms of a Wheatstone bridge must differ by $\pi$ in azimuth. The normalized output of a bridge sensitive to C only is:

$$Y = 2(K_A - K_B)C \qquad (47)$$

Next, the constraints for a configuration sensitive to A only is developed. The constraints on K for insensitivity to C have been developed, namely $K_1 = K_2 = K_A$ and $K_3 = K_4 = K_B$ (equation (39)). Incorporating these into the normalized bridge equation (34):

$$Y = K_A(A(\sin\theta_1 - \sin\theta_2) + B(\cos\theta_1 - \cos\theta_2)) + K_B(A(\sin\theta_3 - \sin\theta_4) + B(\cos\theta_3 - \cos\theta_4)) \qquad (48)$$

To be sensitive to A only $$\cos\theta_1 = \cos\theta_2 \text{ and } \cos\theta_3 = \cos\theta_4: \qquad (49)$$

As before, the gauges are related in pairs with no required relationship between the two pairs. Notice here that this requires pairing of adjacent arms (1-2 and 3-4) rather than opposite arms (1-3 and 2-4) as seen before.

The general solution for a gauge pair is: $\theta_{2n} = 2m\pi \pm \theta_{2n-1}$. Assuming unique azimuths and removing multiples of $2\pi$:

$$\theta_{2n} = -\theta_{2n-1} \qquad (50)$$

So gauge pairs must be located symmetrically about $\theta=0$ (the x axis). Applying this constraint, the normalized output for a bridge sensitive to A only is:

$$Y = 2(K_A \sin\theta_1 + K_B \sin\theta_3)A \qquad (51)$$

Where $\theta_1$ and $\theta_3$ are independent and can be any value. Similarly, for sensitivity to B only:

$$\sin\theta_1 = \sin\theta_2 \text{ and } \sin\theta_3 = \sin\theta_4 \qquad (52)$$

This reduces to:

$$\theta_2 = \pi - \theta_1; \theta_4 = \pi - \theta_3 \qquad (53)$$

So the gauge pairs must be symmetric about $\theta = \pi/2$ (the y-axis). The normalized output for a bridge sensitive to B only is:

$$Y = 2(K_A \cos\theta_1 + K_B \cos\theta_3)B \qquad (54)$$

As before, $\theta_1$ and $\theta_3$ can be selected to achieve a desired output level.

The configuration of all four-arm bridges has now been determined. One important result is that no gauge is required to be located at a specific value of azimuth. This means that it is should be possible to construct six independent four-arm bridges with no two gauges required to be at the same position. This is a very important consideration if the strain gauges are to be applied along a single circumference. The output and arrangement of the bridges will now be determined for each of the six specific load elements.

For the axial load since both K values must be used, two gauges in opposite arms must be axial gauges ($\beta_\tau = 0$) and spaced $\pi$ apart in azimuth. The remaining two gauges must be circumferential gauges ($\beta_\tau = \pi/2$, since using more parallel gauges would render the bridge insensitive to axial load), also spaced $\pi$ apart in azimuth. The normalized output of the resulting bridge is determined by substituting equations (35) and (38) into (47):

$$Y = \frac{2(1+v)}{EA} P_z \qquad (55)$$

The azimuth constraints for this bridge are:

$$\theta_3 = \theta_1 + \pi; \theta_4 = \theta_2 + \pi \qquad (56)$$

where $\theta_1$ and $\theta_2$ can be any azimuth values. For the torsional load, the same pattern is followed, pairs of opposite gauges spaced $\pi$ apart in azimuth, so the azimuth constraints are those of equation (56). Here though, the angle of the gauges to the axis must be $\beta_\tau$ for one pair and $-\beta_\tau$ for the other pair. The resulting output is determined by substituting equation (37) and (38) into (47):

$$Y = \frac{8r\sqrt{v}}{EJ} M_z \qquad (57)$$

For moment about the x axis, adjacent arm gauge pairs (1-2 and 3-4) must be located symmetrically about $\theta=0$ or the x axis at locations of $\pm\theta_1$ and $\pm\theta_3$. Both $\theta_1$ and $\theta_3$ may be chosen independently. Therefore, the gauges may be applied as axial or circumferential pairs. Arbitrarily choosing which gauge orientation (axial or circumferential) to designate as $\theta_1$ leaves three distinct possible outputs for the bridge. Each of these outputs is also a function of $\theta_1$ and $\theta_3$. The three possibilities are determined by substituting the K values of equations (35) and (36) into equation (51). They are:

All gauges axial:

$$Y_1 = \frac{2(\sin\theta_1 + \sin\theta_3)r}{EI} M_x \qquad (58)$$

All gauges circumferential:

$$Y_2 = \frac{-2v(\sin\theta_1 + \sin\theta_3)r}{EI} M_x \qquad (59)$$

One pair axial (1-2), one pair circumferential (3-4):

$$Y_3 = \frac{2(\sin\theta_1 - \nu\sin\theta_3)r}{EI} M_x \quad (60)$$

Choosing axial gauges for highest output and specifying:

$$\sin\theta_1 = \sin\theta_3 \quad (61)$$

to simplify the output relation results in azimuth positions that are a function of a single arbitrary azimuth value ($\theta_1$). Two independent azimuths could also be used. The equation (61) constraint leads to:

$$\theta_2 = -\theta_1 \text{ and } \theta_3 = \pi - \theta_1 \text{ and } \theta_4 = \pi + \theta_1 \quad (62)$$

With a normalized output of:

$$Y = \frac{4r\sin\theta_1}{EI} M_x \quad (63)$$

Performing similar substitutions for sensitivity to moment about the y axis using equations (35), (38), and (54) results in:

All gauges axial:

$$Y_1 = \frac{-2(\cos\theta_1 + \cos\theta_3)r}{EI} M_y \quad (64)$$

All gauges circumferential:

$$Y_2 = \frac{2\nu(\cos\theta_1 + \cos\theta_3)r}{EI} M_y \quad (65)$$

One pair axial (1-2), one pair circumferential (3-4):

$$Y_3 = \frac{-2(\cos\theta_1 - \nu\cos\theta_3)r}{EI} M_y \quad (66)$$

Again, using all axial gauges gives the maximum output. The selection of $\theta_1$ and $\theta_3$ is independent as before. Here the gauge pairs must be symmetric about the y axis ($\theta = \pi/2$). The appearance of negative signs in some of the outputs is to maintain the sign convention for the bridge and the right hand rule for moments. The convention requires a positive output from the bridge when a positive (tensile) strain is applied to gauge number one. As with the x axis moments, azimuth values can be chosen in pairs to simplify the sensitivity equation satisfying:

$$\cos\theta_1 = \cos\theta_3 \quad (67)$$

resulting in azimuth constraints of:

$$\theta_2 = \pi - \theta_1; \theta_3 = -\theta_1; \theta_4 = \pi + \theta_1 \quad (68)$$

This results in an output relation of:

$$Y = \frac{-4r\cos\theta_1}{EI} M_y \quad (69)$$

The derivation of the bridges for transverse shear response gauges follows the same format. The only change is that the values of the constants A, B, and C are given in equations (38) rather than (36). The relationships are somewhat simplified by the fact that the appropriate gauge angles are of the same magnitude but opposite in sign. The constraints on gauge angles are that members of a gauge pair (1-2) and (3-4) must be positioned at the same angle ($\beta$). The possibility of two gauge pairs positioned at either of two $\beta$ angles leads to four possible configurations. For shear load in the x direction, the four possible outputs are:

$$Y = -\frac{4\sqrt{\nu}(\pm\sin\theta_1 \pm \sin\theta_3)Q_{\max}}{EI(D-d)} P_x \quad (70)$$

The signs on the sine terms are positive for a gauge pair at $+\beta_\tau$ and negative for a gauge pair at $-\beta_\tau$. Since the functional dependence on $\theta$ is identical to that of moment about the x axis, the azimuth constraints are the same as those presented in equation (62). Placing all gauges at an angle of $-\beta_\tau$ results in maximum positive output for positive shear load:

$$Y = -\frac{8\sqrt{\nu} Q_{\max} \sin\theta_1}{EI(D-d)} P_x \quad (71)$$

The relations for shear in the y direction are virtually identical with substitution of cosines for sines and the elimination of a minus sign needed above to preserve the sign convention. For y direction shear, the possible bridge outputs are:

$$Y = \frac{4\sqrt{\nu}(\pm\cos\theta_1 \pm \cos\theta_3)Q_{\max}}{EI(D-d)} P_y \quad (72)$$

Similarly to the x direction shear, this equation corresponds to the output for bending about the y axis so the azimuth constraints are shown in equation (68). The normalized output is:

$$Y = -\frac{8\sqrt{\nu} Q_{\max} \cos\theta_1}{EI(D-d)} P_y \quad (73)$$

The normalized output relationships and azimuth constraints for all six load components have now been developed. Table 1 summarizes these relationships. In Table 1 the gauge azimuths have been augmented with a load designator to indicate which load the gauge is sensitive to. This provides a unique designator for each selectable azimuth. The sensitivities shown are no longer normalized, that is they include the bridge excitation voltage (V) and the gauge factor (F). Further, all sensitivities are positive. The sign was changed on negative sensitivities by changing the sign of the gauge angle ($\beta$) on all four gauges where appropriate. This was done so that, for all bridge configurations listed, a positive load results in a positive output. Finally, for torsion and bending loads, the radius of the gauge position (r) is assumed to be the outer surface of the annulus (D/2). This is discussed in more detail below.

TABLE 1

Summary of load cell design parameters

| Component Sensed | Sensitivity (Volts/Load) | Gauge Number | Azimuth ($\theta$) | Gauge Angle ($\beta$) |
|---|---|---|---|---|
| Axial Load, $P_z$ | $\dfrac{1+v}{2EA}FV$ | Pz1<br>Pz2<br>Pz3<br>Pz4 | $\theta_{Pz1}$<br>$\theta_{Pz2}$<br>$\theta_{Pz1} + \pi$<br>$\theta_{Pz2} + \pi$ | 0<br>$\pi/2$<br>0<br>$\pi/2$ |
| Torsion, $M_z$ | $\dfrac{\sqrt{v}D}{2EI}FV$ | Mz1<br>Mz2<br>Mz3<br>Mz4 | $\theta_{Mz1}$<br>$\theta_{Mz2}$<br>$\theta_{Mz1} + \pi$<br>$\theta_{Mz2} + \pi$ | $-\beta_\tau$<br>$\beta_\tau$<br>$-\beta_\tau$<br>$\beta_\tau$ |
| X-Axis Bending Moment, $M_x$ | $\dfrac{D\sin\theta_{Mx}}{2EI}FV$ | Mx1<br>Mx2<br>Mx3<br>Mx4 | $\theta_{Mx}$<br>$-\theta_{Mx}$<br>$\pi - \theta_{Mx}$<br>$\pi + \theta_{Mx}$ | 0<br>0<br>0<br>0 |
| Y-Axis Bending Moment, $M_y$ | $\dfrac{D\cos\theta_{My}}{2EI}FV$ | My1<br>My2<br>My3<br>My4 | $\pi - \theta_{My}$<br>$\theta_{My}$<br>$\pi + \theta_{My}$<br>$-\theta_{My}$ | 0<br>0<br>0<br>0 |
| X Direction Force, $P_x$ | $\dfrac{2\sqrt{v}\sin\theta_{Px}Q_{max}}{EI(D-d)}FV$ | Px1<br>Px2<br>Px3<br>Px4 | $\theta_{Px}$<br>$-\theta_{Px}$<br>$\pi - \theta_{Px}$<br>$\pi + \theta_{Px}$ | $\beta_\tau$<br>$\beta_\tau$<br>$\beta_\tau$<br>$\beta_\tau$ |
| Y Direction Force, $P_y$ | $\dfrac{2\sqrt{v}\cos\theta_{Py}Q_{max}}{EI(D-d)}FV$ | Py1<br>Py2<br>Py3<br>Py4 | $\theta_{Py}$<br>$\pi - \theta_{Py}$<br>$-\theta_{Py}$<br>$\pi + \theta_{Py}$ | $-\beta_\tau$<br>$-\beta_\tau$<br>$-\beta_\tau$<br>$-\beta_\tau$ |

The design of the load cell involves material selection to determine the modulus of elasticity (E), Poisson's ratio (v) and the maximum allowable strain; specification of the inner (d) and outer (D) diameter; specification of the radius of gauge placement; and specification of the azimuth angles ($\theta$) of the bridges. Some relationships to help optimize the design are discussed next.

The radius of gauge placement is of importance for the bending and torsional response. Only two realistic choices exist, the inner and outer annulus diameters. For simplicity, the outer diameter (D) will be used. This greatly simplifies gauge placement. It also adds the requirement that the gauges must be protected by an external shield. However, this is minor compared to the difficulty involved in accurately placing the gauges inside the annulus.

Material selection determines the modulus of elasticity and Poisson's ratio. The actual value of the elastic modulus is relatively unimportant. The value of greatest importance is the allowable strain before yielding. The allowable strain is directly proportional to the output of all the bridges so a large allowable strain is desired. Allowable strain is the ratio of yield stress to elastic modulus. Of common engineering materials, 7000 series aluminum with a yield strain of 0.7% is one of the highest. Strain gauges that are temperature compensated for aluminum are readily available.

The output factor for the bridges relates the applied load to the voltage output. Each of these can be expressed as a function of the elastic modulus (E), Poisson's ratio (v), the inner and outer diameter (D, d), gauge factor (F), applied bridge voltage (V), and the independent azimuths ($\theta$) from Table 1. The six relationships are shown in Table 2. These are derived directly from Table 1 and equations (15), (17), (20), and (22).

TABLE 2

Load Cell Sensitivities

| Component Sensed | Sensitivity (Volts/Load) |
|---|---|
| Axial Load, $P_z$ | $\dfrac{2(1+v)FV}{\pi ED^2(1-\rho^2)}$ |
| Torsion, $M_z$ | $\dfrac{32\sqrt{v}\,FV}{\pi ED^3(1-\rho^4)}$ |
| X-Axis Bending Moment, $M_x$ | $\dfrac{32\sin\theta_{Mx}FV}{\pi ED^3(1-\rho^4)}$ |
| Y-Axis Bending Moment, $M_y$ | $\dfrac{32\cos\theta_{My}FV}{\pi ED^3(1-\rho^4)}$ |
| X Direction Force, $P_x$ | $\dfrac{32\sqrt{v}\sin\theta_{Px}(1-\rho^3)FV}{3\pi ED^2(1-\rho^4)(1-\rho)}$ |
| Y Direction Force, $P_y$ | $\dfrac{32\sqrt{v}\sin\theta_{Py}(1-\rho^3)FV}{3\pi ED^2(1-\rho^4)(1-\rho)}$ |

These relationships are all that are needed to design a load cell for a desired sensitivity. To simplify these relationships, one additional variable is introduced:

$$\rho = \frac{d}{D}. \tag{74}$$

In Table 2 the secondary azimuths for axial load and torsion have been selected to provide four-way symmetry for all six bridges. This is not a requirement; it is only more convenient for gauge placement and sensitivity relations. The selection of bridge azimuth can be used to adjust the relative bridge outputs or to select convenient locations for the gauges. If the shear bridge azimuths ($\theta_{Px}$ and $\theta_{Py}$) are used to adjust the output, the sensitivity of the three force bridges can be set to the same value. The value of $\theta_{Px}$ can be determined by setting the sensitivities equal and solving:

$$\theta_{Px} = \arcsin\left(\frac{3(1+v)(1+\rho^2)(1-\rho)}{16\sqrt{v}(1-\rho^3)}\right) \tag{75}$$

This value ranges from about 17–25 degrees depending on $\rho$. For the y direction force bridge, the equation is identical except that $\theta_{Py}$ is determined by an arc cosine rather than an arc sine, giving a typical range of 65–73 degrees.

For moment about the x axis, the $\theta_{Mx}$ value can be chosen to match the z axis torque sensitivity:

$$\theta_{Mx} = \arcsin\sqrt{v} \tag{76}$$

This is about 35 degrees. As before, the $\theta_{My}$ value for bending about the y axis uses the arc cosine rather than the arc sine, resulting in a value of about 55 degrees.

The above solutions for azimuth provide a single sensitivity for all three loads and all three moments. This, in turn, requires less signal processing. However, the azimuth values determined will position the gauges a relatively short distance from the axis of the applied load. This means that the sensitivity is lower than that which might be achieved otherwise and that the contributions from other loads (which are canceled by the full bridge arrangement) are larger than otherwise. This combination could lead to some undesired sensitivity to other loads. In short, this is a design tradeoff between simplicity and accuracy that must be considered when selecting azimuth values.

One additional selection is possible to relate the force and moment sensitivities to each other. The Sensitivity to force and moment cannot be identical because the two types of loads have different units (lb. vs. inch-lb. or Newton vs. Newton-meter) However, for some selected radius, R (such as an inch, foot, centimeter, or meter) the design of the load cell can be adjusted to match the two sensitivities. For example, with a selected radius of one inch, the sensitivity can be designed so that the output for one pound on any force bridge matches the output at one inch-pound on any moment bridge. To do this, the following relationship must be satisfied:

$$R = \frac{(1+\rho^2)(1+v)}{16\sqrt{v}} D \qquad (77)$$

The annulus diameter and wall thickness can be adjusted to achieve this matching output. However, the range of adjustment is usually fairly limited and matched output may not always be practical. For example, a thin walled aluminum annulus requires a D/R ratio of 6.9 so a diameter of nearly 6.9 inches is needed to equate the output in-lb. to that in in–lb.

In addition to the issues regarding bridge sensitivity, mechanical issues must also be considered. First among these is assuring that a true uniform strain field results from the loading. By Saint-Venant's principle, the strain gauges must be sufficiently far from the applied load and from any stress concentration to assure a uniform strain field. Although no concrete guidelines exist for what is "sufficiently far", a few times the thickness of the annulus wall is probably sufficient. This means that this type of load cell may have a higher profile than traditional six-axis load cells.

Figure 7:
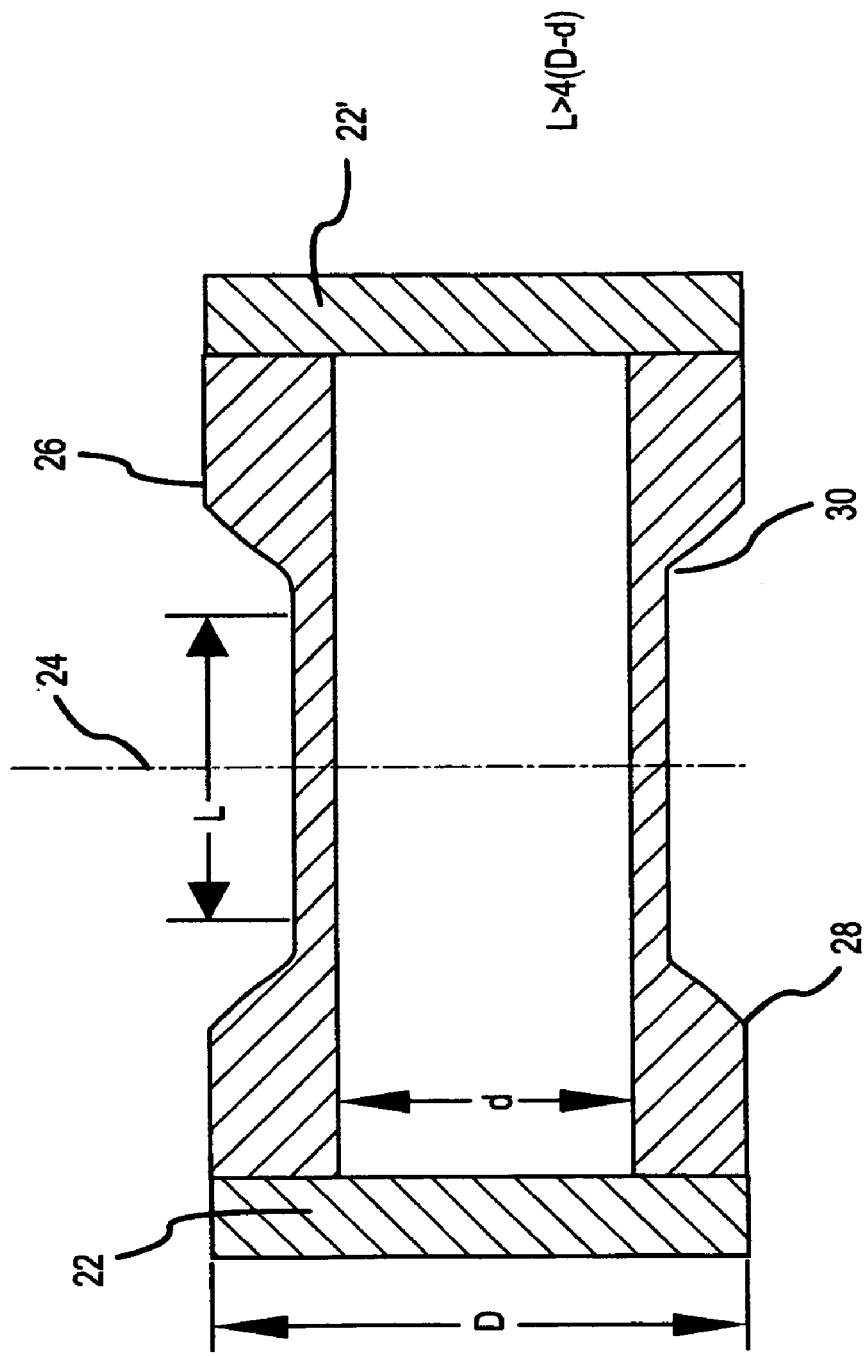
FIG. 7 illustrates a cross section of a load cell annulus.

FIG. 7 shows a schematic of a cross section of a suitable load cell annulus. The loads are applied to the load cell by means of the endplates 22 and the gauges are located along the centerline 24, which is drawn midway around the annulus 26. Large radii such as indicated at 28 and 30 are provided.

The sensitivity and maximum allowable load on the load cell will be determined by the elastic constants, the diameters, and the maximum allowable strain. In general, smaller diameter load cells will be more sensitive. For small diameters, it may be very difficult to position all 24 gauges around the circumference. In such cases, the gauges can be split into multiple sets of gauges. In order to split the gauges into separate circumferences about the annulus, some basic conditions must be satisfied. First, since only the gauges for measuring the moments about the X and Y axes are sensitive to position along the load cell axis, the eight gauges comprising the X and Y bending moment bridges must be located around the same circumference. Next, the distance vector to the applied load used to determine the moment loading must be measured from the circumference containing the X and Y bending moment bridges. Since each four gauge bridge depends on equal and opposite signals to provide cancellation of unwanted strains, any four gauge bridge must be completely contained on a single circumference. Finally, all gauges must be placed sufficiently far from the ends of the uniform thin walled section of the annulus to be in a uniform strain field.

A six-axis load cell was constructed based on this instrumentation of an annulus with strain gauges. The load cell produces six independent analog outputs, each one directly proportional to one of the six generalized load components. The load cell is a simple tube with suitable ends to apply the loads and a number of strain gauges mounted on the annular surface. This design is intended to provide a rugged load cell with reasonably good resolution that is relatively inexpensive to manufacture and requires minimum processing electronics.

A perspective side view of the load cell 10 was shown in FIG. 1. Table 1 shows that there are eight independent azimuth angles that must be chosen to specify the location of all 24 strain gauges.

FIGS. 8a and 8b illustrate the gauge locations chosen for the constructed load cell 10. The angles are $\theta_{Pz1}=0°$, $\theta_{Pz2}=90°$, $\theta_{Mz1}=45°$, $\theta_{Mz2}=135°$, $\theta_{Mx}=60°$, $\theta_{My}=30°$, $\theta_{Px}=75°$, and $\theta_{Py}=15°$. Selection of these angles provides equally spaced gauges at steps of 15°. However, other gauge azimuth selections could be chosen equally well. The gauges are located along two separate circumferences with the axial load and bending moment gauges on one circumference and the torsion and shear gauges on the other. This load cell is made of aluminum with a Poisson's ratio of 0.33 giving a $\beta_\tau$ of 60°. The load cell has an annulus outer diameter of 2" and an inner diameter of 1⅞". The enlarged ends are provided to allow for bolt circles on each end to attach to the loads.

The electrical connection of the gauges is shown in FIG. 9. In operation, a DC voltage (typically 10 volts) is applied to the input terminals and the six outputs are measured as differential voltages across pairs of output lines. The system was tested using various static loads in a manner to apply each of the six load components separately. The testing verified that each of the six bridges is sensitive to only one of the six load components, that the load cell response is linear and that the sensitivity matches the predicted value well.

The concept of producing a six-axis load cell by attaching strain gauges to an annulus are also applicable to any prismatic shape (any cross-section as long as the cross-section is constant over a great enough length to eliminate strain concentrations). For any general shape, another form of the load-strain relationship exists. It can be derived by closed form analysis, numerical analysis, or experiment. In any event, the existence of a load strain relation where strain is a linear combination of the six applied load components is assured. This alone says that a six-axis load cell can be constructed from any prismatic shape. The load strain relation will not typically have a simple trigonometric dependence on azimuth but can still be quite simple. An example is for a square tubular cross section where one of the load-strain relations for the outer surface is:

$$\varepsilon = \left(\frac{-M_y D}{4EI} + \frac{P_z}{2EA}\right)[(1-v) + (1+v)\cos(2\beta)] + \left(\frac{P_y(D(D^2-c^2)-d(d^2-c^2))}{EI(D-d)} + \frac{M_z}{EK}\right)(1+v)\sin(2\beta) \qquad (78)$$

This relation is for the surface normal to the x axis. Now D and d are the inner and outer dimensions of the square tube, and c is the distance from the centerline to where the strain is measured. A, I, and K are defined as:

$$A = D^2 - d^2 \quad (79)$$

$$I = \frac{D^4 - d^4}{12} \quad (80)$$

$$K = \frac{(D+d)^2(D-d)}{4} \quad (81)$$

This particular formulation for K is valid for a thin wall. No simple relation exists for a tube of any thickness. However, for any given thickness, K can be determined. By letting θ=0° in equation (25) the similarity between the circular and square forms is obvious. A second similar relation exists for the surface normal to the y axis. An appropriate set of gauge positions for a thin walled square tube is shown in FIGS. 10a and 10b.

Some decoupling of the loads from the strains is inherent by the very nature of the geometry. As with the annular case, the same $\beta_\tau$ values will decouple shear and torsion from axial load and bending. These two types of decoupling are similar to that for circular geometry in that simple gauge positioning rules and connection strategies will fully decouple the load components. The decoupling of the six equations afforded by the use of circular geometry is not guaranteed to exist for a general shape. However, for a shape with sufficient axes of symmetry, decoupling can be achieved using bridges similar to the annular case presented above.

The load cell design described was driven by a desire for minimum on-board electronics and the construction of complete four-arm bridges where each bridge provides a signal proportional to one of the six desired loads and is insensitive to the other five. With the advent of small, low-power single chip microprocessors it is possible to build a six-axis load cell where only six strain gauges are required instead of the 24 gauge system discussed above. Since six independent loads must be measured, the minimum number of gauges that can be used is six. The requirements for gauge positioning and signal conditioning can be derived beginning with equation (25):

$$\varepsilon = \left(\frac{M_x r \sin\theta - M_y r \cos\theta}{2EI} + \frac{P_z}{2EA}\right)[(1+v) + (1+v)\cos(2\beta)] + \left(\frac{(P_x \sin\theta - P_y \cos\theta)Q_{max}}{EI(D-d)} + \frac{M_z r}{EJ}\right)(1+v)\sin(2\beta) \quad (25)$$

This is the general relationship for axial strain produced in a circular annulus by the six applied loads at azimuth angle θ and the gauge angle β. For the gauge angles of 0 and $+\beta_\tau$ this reduces to:

$$\varepsilon_0 = \left(\frac{M_x r \sin\theta - M_y r \cos\theta}{EI} + \frac{P_z}{EA}\right) \quad (82)$$

$$\varepsilon_{\beta_\tau} = 2\sqrt{v}\left(\frac{(P_x \sin\theta - P_y \cos\theta)Q_{max}}{EI(D-d)} + \frac{M_z r}{EJ}\right) \quad (83)$$

For three gauges arbitrarily placed at azimuths $\theta_1$, $\theta_2$, and $\theta_3$, two sets of three coupled equations result between three of the applied loads and the three strains at either gauge angle. These relations are shown in equations (84) and (85). The two arguments of the strain values (ε) are the gauge angle and azimuth angle respectively.

$$\begin{bmatrix} \varepsilon(0,\theta_1) \\ \varepsilon(0,\theta_2) \\ \varepsilon(0,\theta_3) \end{bmatrix} = \begin{bmatrix} \sin\theta_1 & \cos\theta_1 & 1 \\ \sin\theta_2 & \cos\theta_2 & 1 \\ \sin\theta_3 & \cos\theta_3 & 1 \end{bmatrix} \begin{bmatrix} \frac{M_x r}{EI} \\ \frac{M_y r}{EI} \\ \frac{P_z}{EA} \end{bmatrix} \quad (84)$$

$$\begin{bmatrix} \varepsilon(\beta_\tau,\theta_1) \\ \varepsilon(\beta_\tau,\theta_2) \\ \varepsilon(\beta_\tau,\theta_3) \end{bmatrix} = \begin{bmatrix} \sin\theta_1 & \cos\theta_1 & 1 \\ \sin\theta_2 & \cos\theta_2 & 1 \\ \sin\theta_3 & \cos\theta_3 & 1 \end{bmatrix} \begin{bmatrix} 2\sqrt{v}\frac{P_x Q_{max}}{E(D-d)} \\ -2\sqrt{v}\frac{P_y Q_{max}}{E(D-d)} \\ 2\sqrt{v}\frac{M_z r}{EJ} \end{bmatrix} \quad (85)$$

The closed form expressions for each of the six loads in terms of the measured strains can be determined by inverting the coefficient matrix from equations (84) and (85):

$$\begin{bmatrix} \sin\theta_1 & \cos\theta_1 & 1 \\ \sin\theta_2 & \cos\theta_2 & 1 \\ \sin\theta_3 & \cos\theta_3 & 1 \end{bmatrix}^{-1} = \quad (86)$$

$$\frac{\begin{bmatrix} \cos\theta_2 - \cos\theta_3 & \cos\theta_3 - \cos\theta_1 & \cos\theta_1 - \cos\theta_2 \\ \sin\theta_3 - \sin\theta_2 & \sin\theta_1 - \sin\theta_3 & \sin\theta_2 - \sin\theta_1 \\ \sin(\theta_2 - \theta_3) & \sin(\theta_3 - \theta_1) & \sin(\theta_1 - \theta_2) \end{bmatrix}}{\sin(\theta_1 - \theta_2) + \sin(\theta_2 - \theta_3) + \sin(\theta_3 - \theta_1)}$$

The inverse shows that conditions exist where a unique solution for the six loads may not the possible. This is where the inverse becomes singular. Singularity occurs at:

$$\sin(\theta_1 - \theta_2) + \sin(\theta_2 - \theta_3) + \sin(\theta_3 - \theta_1) = 0 \quad (87)$$

The conditions where this equation can be satisfied are examined. First, the selection of the reference axis (azimuth of 0) is arbitrary. Rotating the axis to a new position has no effect on any of the sine terms since they are depending only on the difference in angles. Because of this, $\theta_3$ can be arbitrarily set to zero without any loss of generality. Doing this reduces the singularity constraint to:

$$\sin(\theta_1 - \theta_2) + \sin\theta_2 - \sin\theta_1 = 0 \quad (88)$$

$$\sin\theta_1 \cos\theta_2 - \sin\theta_2 \cos\theta_1 + \sin\theta_2 - \sin\theta_1 = 0$$

$$\frac{\sin\theta_2}{1 - \cos\theta_2} = \frac{\sin\theta_1}{1 - \cos\theta_1}$$

$$\cot\frac{\theta_2}{2} = \cot\frac{\theta_1}{2}$$

This final relationship is satisfied only when $\theta_1 = \theta_2$. Because of the arbitrary selection of $\theta_3$ this shows that if any two of the azimuth angles are equal, the loads cannot be uniquely determined. From a practical standpoint, having two gauges with equal azimuth and gauge angle reduces the number of unique gauges to less than the minimum required which intuitively precludes determining the six applied loads.

Solving equations (84) and (85) results in the following six independent equations for the six loads. The relationships are somewhat cumbersome but are completely general for a six-axis load cell consisting of three gauges placed at zero gauge angle and three gauges placed at $+\beta_\tau$. Any set of three unique azimuth positions can be chosen for each set of three equations.

$$\begin{bmatrix} P_x \\ P_y \\ M_z \end{bmatrix} = \frac{E \begin{bmatrix} -\frac{D-d}{Q_{max}}(\cos\theta_2 - \cos\theta_3) & -\frac{D-d}{Q_{max}}(\cos\theta_3 - \cos\theta_1) & -\frac{D-d}{Q_{max}}(\cos\theta_1 - \cos\theta_2) \\ \frac{D-d}{Q_{max}}(\sin\theta_3 - \sin\theta_2) & \frac{D-d}{Q_{max}}(\sin\theta_1 - \sin\theta_3) & \frac{D-d}{Q_{max}}(\sin\theta_2 - \sin\theta_1) \\ \frac{J}{r}\sin(\theta_2 - \theta_3) & \frac{J}{r}\sin(\theta_3 - \theta_1) & \frac{J}{r}\sin(\theta_1 - \theta_2) \end{bmatrix}}{2\sqrt{v}\,(\sin(\theta_1 - \theta_2) + \sin(\theta_2 - \theta_3) + \sin(\theta_3 - \theta_1))} \begin{bmatrix} \varepsilon(\beta_\tau, \theta_1) \\ \varepsilon(\beta_\tau, \theta_2) \\ \varepsilon(\beta_\tau, \theta_3) \end{bmatrix} \quad (90)$$

$$\begin{bmatrix} M_x \\ M_y \\ P_z \end{bmatrix} = \frac{E \begin{bmatrix} \frac{I}{r}(\cos\theta_2 - \cos\theta_3) & \frac{I}{r}(\cos\theta_3 - \cos\theta_1) & \frac{I}{r}(\cos\theta_1 - \cos\theta_2) \\ -\frac{I}{r}(\sin\theta_3 - \sin\theta_2) & -\frac{I}{r}(\sin\theta_1 - \sin\theta_3) & -\frac{I}{r}(\sin\theta_2 - \sin\theta_1) \\ A\sin(\theta_2 - \theta_3) & A\sin(\theta_3 - \theta_1) & A\sin(\theta_1 - \theta_2) \end{bmatrix}}{\sin(\theta_1 - \theta_2) + \sin(\theta_2 - \theta_3) + \sin(\theta_3 - \theta_1)} \begin{bmatrix} \varepsilon(0, \theta_1) \\ \varepsilon(0, \theta_2) \\ \varepsilon(0, \theta_3) \end{bmatrix}$$

One option is to place gauges every 60 degrees around the circumference. Arbitrarily, the gauges at zero gauge angle are placed at 0, 120, and 240 degrees and the gauges at $+\beta_\tau$ are placed at 60, 180, and 300 degrees. The resulting equations for the six loads reduce to:

$$P_x = \frac{E(D-d)}{2\sqrt{3v}\,Q_{max}}[\varepsilon(\beta_\tau, \theta_2) - \varepsilon(\beta_\tau, \theta_3)] \quad (91)$$

$$P_y = \frac{E(D-d)}{6\sqrt{v}\,Q_{max}}[2\varepsilon(\beta_\tau, \theta_1) - \varepsilon(\beta_\tau, \theta_2) - \varepsilon(\beta_\tau, \theta_3)]$$

$$P_z = \frac{EA}{3}[\varepsilon(0, \theta_1) + \varepsilon(0, \theta_2) + \varepsilon(0, \theta_3)]$$

$$M_x = \frac{EI}{\sqrt{3}\,r}[\varepsilon(0, \theta_2) - \varepsilon(0, \theta_3)]$$

$$M_y = \frac{EI}{3r}[2\varepsilon(0, \theta_1) - \varepsilon(0, \theta_2) - \varepsilon(0, \theta_3)]$$

$$M_z = \frac{J}{6\sqrt{v}\,r}[\varepsilon(\beta_\tau, \theta_1) + \varepsilon(\beta_\tau, \theta_2) + \varepsilon(\beta_\tau, \theta_3)]$$

this is one potentially attractive solution for producing a simple six-axis load cell with circular cross-section. Only six gauges are required and they are equally spaced around the circumference.

As the overall size of the load cell is reduced, the surface curvature of a circular cross-section becomes a problem. Instead a polygonal shape can be used so that all gauged surfaces are flat. In the above example, a hexagonal cross-section would suffice. The stiffness properties of the cross-section, particularly the polar moment inertia must be calculated specifically for the section. A still simpler device could also be produced using a square cross-section. Placing a $+\beta_\tau$ and an axial gauge on each of three faces results in azimuth angles of zero, 90°, and −90°. The axial and $+\beta_\tau$ gauge can both be located at the same azimuth since the $+\beta_\tau$ gauges measure torsion and shear which is independent of axial position. The resulting six equations for a square load cell are:

$$P_x = -\frac{E(D-d)}{4\sqrt{v}\,Q_{max}}[\varepsilon(\beta_\tau, \theta_2) - \varepsilon(\beta_\tau, \theta_3)] \quad (92)$$

$$P_y = \frac{E(D-d)}{4\sqrt{v}\,Q_{max}}[2\varepsilon(\beta_\tau, \theta_1) - \varepsilon(\beta_\tau, \theta_2) - \varepsilon(\beta_\tau, \theta_3)]$$

$$P_z = \frac{EA}{2}[\varepsilon(0, \theta_2) + \varepsilon(0, \theta_3)]$$

$$M_x = \frac{EI}{2r}[\varepsilon(0, \theta_2) - \varepsilon(0, \theta_3)]$$

$$M_y = \frac{EI}{2r}[2\varepsilon(0, \theta_1) - \varepsilon(0, \theta_2) - \varepsilon(0, \theta_3)]$$

$$M_z = \frac{5J}{32\sqrt{v}\,r}[\varepsilon(\beta_\tau, \theta_2) + \varepsilon(\beta_\tau, \theta_3)]$$

Here, the polar moment of inertia (J) must be adjusted to reflect the actual stiffness of square cross-section.

The above results show that, for selected azimuth angles, the applied loads are functions of integral combinations of selected gauges multiplied by a suitable proportionality constant. The simple relationships for converting strain into load indicate that only minimal manipulation of the strain gauge outputs is required to produce signals proportional to applied loads. Even a low-end programmable controller is capable of evaluating the required functions with an update rate of at least 100 Hz. A programmable controller on-board the load cell along with 18 dummy resistors (three to complete each of the six strain gauge bridges) is all that is required to provide digital output from the six gauge cell. One additional signal condition requirement also exists for large strains. This is the correction to the inherent nonlinearity of quarter arm bridges. This correction is applied to the incoming individual gauge signals.

As with the 24-gauge load cell, the six-gauge load cell uses specific placement of the strain gauges to decouple the resulting load strain relationships. As discussed previously, equation (25) shows that six gauges placed arbitrarily on an annulus contain enough information to constitute a six-axis load cell provided the six resulting strain equations are linearly independent. These resulting strain equations are generally fully coupled. If sufficient signal processing—via processing means such as a microprocessor or other processing means having suitable computer readable media—is available to decouple the load-strain equations in software rather than by gauge positioning, a viable six-axis load cell can be produced using such arbitrarily placed gauges. In practice, the decoupling matrix can be generated through a generalized calibration procedure of the load cell where a coefficient matrix is generated by performing a multivariate regression technique, such as linear or nonlinear regression, on a set of applied loads correlated to the resulting strains. The inverse of the coefficient matrix then is applied to the measured strain vector to determine the unknown load components.

This technique has some significant advantages over the previous load cells discussed. Since the load cell material is linearly elastic in the region of use, the load-strain equations must be linear even if no closed form strain solution exists for the geometry chosen. This is an important observation for dealing with Saint-Venant effects. The linear nature of the equations assures that the calibration matrix can be obtained by the calibration procedure mentioned above regardless of non-uniform stress fields and stress or strain concentrations. This allows for more radical load cell geometries to be considered than are otherwise possible. For example, a simple pancake load cell made of a very short length of tubing with internal flanges should be perfectly adequate. In short, virtually any arbitrary shape can constitute a six-axis load cell. The only constraint is that the positioning of the gauges must result in six linearly independent strain relations. For such a load cell, six gauges are not a set requirement but only a minimum. The multivariate regression calibration technique can accommodate any number of gauges.

A minimum gauge load cell can be constructed using only six strain gauges, but additional gauges can be added. When this is done, the calibration procedure uses a multivariate regression technique to determine the relationship between the strain values and the applied loads. Processing means coupled with the strain gauge outputs are used to decouple the load-strain equations. The calibration procedure can be achieved by developing any strain matrix consisting of the strain gauge output readings of n gauges at m different load configurations. This results in a strain matrix ($\epsilon$) with n columns and m rows. There is a corresponding load matrix (P) with m rows with one row representing each of the load configurations and six columns with one column representing each of the six load components. The coefficient matrix that converts the strain reading to the applied load (C) has six rows and m columns. The coefficient matrix is determined by:

$$C = (\epsilon^T \epsilon)^{-1} (\epsilon^T P) \quad (94)$$

The load applied ($P_{app}$) as a function of the measured strain ($\epsilon_{meas}$) values can then be determined by:

$$P_{app} = C \epsilon_{meas} \quad (95)$$

This procedure will work for any number of the gauges including the minimum required six gauge configuration although, for the six gauge configuration, the equations reduce identically to the closed form solution of six linearly independent relationships.

The general strain relationships for the end loaded annulus are:

$$\varepsilon = \left( \frac{M_x r \sin\theta - M_y r \cos\theta}{2EI} + \frac{P_z}{2EA} \right)[(1-v) + (1+v)\cos(2\beta)] + \left( \frac{(P_x \sin\theta - P_y \cos\theta)Q_{max}}{EI(D-d)} + \frac{M_z r}{EJ} \right)(1+v)\sin(2\beta) \quad (25)$$

When internal pressure is applied to the annulus, it creates a strained state that can be superposed. The stress state caused by internal pressure can be defined by the principal stresses in the axial ($\sigma_0$) and circumferential ($\sigma_{\pi/2}$) directions for an internal pressure $P_i$. The closed form solution for this is:

$$\sigma_0 = \frac{P_i d^2}{D^2 - d^2}, \quad \sigma_{\pi/2} = 2 \frac{P_i d^2}{D^2 - d^2} \quad (96)$$

The associated strains are:

$$\varepsilon_0 = \frac{1}{E}(\sigma_0 - v\sigma_{p/2}), \quad \varepsilon_{\pi/2} = \frac{1}{E}(\sigma_{p/2} - v\sigma_0) \quad (97)$$

$$\varepsilon_0 = \frac{1}{E} \frac{P_i d^2}{D^2 - d^2}(1 - 2v), \quad \varepsilon_{\pi/2} = \frac{1}{E} \frac{P_i d^2}{D^2 - d^2}(2 - v)$$

The pressure induced strain is invariant with azimuth ($\theta$) but is a function of the gauge angle ($\beta$). Using Mohr's circle, the pressure induced strain as a function of $\beta$ is determined as:

$$\varepsilon_\beta = \frac{\varepsilon_0 + \varepsilon_{\pi/2}}{2} + \frac{\varepsilon_0 - \varepsilon_{\pi/2}}{2}\cos(2\beta) \quad (98)$$

$$\varepsilon_\beta = \frac{1}{2E} \frac{P_i d^2}{D^2 - d^2}[3(1-v) - (1+v)\cos(2\beta)]$$

$$\varepsilon_\beta = \frac{1}{2E} \frac{P_i d^2}{D^2 - d^2}[4(1-v) - ((1-v) + (1+v)\cos(2\beta))]$$

The last form is presented for compatibility with equation (25). The pressure induced strain and other load induced strains can be combined with the previous complete solution for the strained annulus resulting in:

$$\varepsilon = \left( \frac{M_x r \sin\theta - M_y r \cos\theta}{2EI} + \frac{P_z}{2EA} - \frac{P_i d^2}{2E(D^2 - d^2)} \right)[(1-v) + (1+v)\cos(2\beta)] + \left( \frac{(P_x \sin\theta - P_y \cos\theta)Q_{max}}{EI(D-d)} + \frac{M_z r}{EJ} \right)(1+v)\sin(2\beta) + \frac{2P_i d^2}{E(D^2 - d^2)}(1-v) \quad (99)$$

The pressure induced strains have been divided into two terms here. The first term is tied to the axial strain and the second term represents the hydrostatic strain. The form of the pressure induced strains show that they cannot be directly measured by using four-arm bridges. With a four-arm bridge the hydrostatic term disappears regardless of the gauge location and orientation. This is also true of a two-arm adjacent bridge since the signals from the two adjacent gauges subtract. Since the remainder of the pressure induced strains are combined directly with axial strain, there is no way to inherently separate these two effects. Thus, pressure can be sensed only by using other gauge configurations that do not involve subtractive gauge pairs. The most common form of bridge that fulfills this description is a single-arm or quarter bridge. Unfortunately, there is no single θ-β combination that can cancel out the strains induced by the other six loads. A much less common form is a two-arm opposite bridge where the signals of the two gauges add together. A possible form of this is:

$$\theta_2 = \theta_1 + \pi \quad \beta_1 = \beta_\tau \quad \beta_2 = -\beta_\tau \quad (100)$$

$$\varepsilon = \frac{4P_i d^2}{E(D^2 - d^2)}(1 - v)$$

By choosing θ values spaced π apart and adding the two gauge outputs, all θ dependent terms vanish. By setting $|\beta|=\beta_\tau$ all cos β terms are zero. By setting $\beta_1=-\beta_2$ all sin β terms cancel when the gauge outputs are added. This leaves only the hydrostatic pressure term.

As a two-arm additive bridge, temperature compensation is a greater concern. It is important to assure that sufficient temperature compensation is provided to properly sense this hydrostatic strain. For a six-axis load cell in the presence of internal pressure, this pressure induced strain must be measured directly this way to allow the axial load to be separated from the internal pressure.

The issue of temperature compensation can be very important especially when semiconductor strain gauges are used to enhance sensitivity. One way of achieving excellent temperature compensation is to use half bridges consisting of pairs of gauges co-located physically close to each other and connected as adjacent members in a bridge circuit. This way the common mode changing resistance caused by temperature fluctuations cancels. Although any set of gauge angles $\beta_1$ and $\beta_2$ could be used for the gauge pair, gauges are available in right angle pairs and orthogonal gauges will generally produce a larger difference in strain (and signal) than other angles. The output of a two-arm bridge is:

$$\Delta V = \frac{VF}{4}(\varepsilon_1 - \varepsilon_2) \quad (101)$$

This follows directly from equation (33). Combining this with equation (25) relates the bridge out the directly to the applied loads. The results shown here incorporate the fact that the gauge pairs are orthogonal.

$$\Delta V = \frac{VF(1+v)}{2}\left[\begin{array}{l}\left(\frac{M_x r\sin\theta - M_y r\cos\theta}{2EI} + \frac{P_z}{2EA}\right)\cos(2\beta) + \\ \left(\frac{(P_x\sin\theta - P_y\cos\theta)Q_{max}}{EI(D-d)} + \frac{M_z r}{EJ}\right)\sin(2\beta)\end{array}\right] \quad (102)$$

As before, with the minimum gauge load cell, inherent separation of six loads is not possible but six linearly independent voltage outputs can be derived by proper selection of θ and β. One example of a set of proper placement angles for a 6 half-bridge load cell is provided in Table 3:

TABLE 3

Bridge outputs for an example minimum gauge, temperature compensated load cell comprised of two-arm bridges

| Bridge Number | Azimuth θ | Gauge angle β | Bridge output |
|---|---|---|---|
| 1 | 0 | 0 | $\frac{VF(1+v)}{4E}\left(\frac{-M_y r}{I} + \frac{P_z}{A}\right)$ |
| 2 | $\frac{2}{3}\pi$ | 0 | $\frac{VF(1+v)}{4E}\left(\frac{\sqrt{3}M_x r + M_y r}{2I} + \frac{P_z}{A}\right)$ |
| 3 | $\frac{4}{3}\pi$ | 0 | $\frac{VF(1+v)}{4E}\left(\frac{-\sqrt{3}M_x r + M_y r}{2I} + \frac{P_z}{A}\right)$ |
| 4 | $\frac{1}{3}\pi$ | $\frac{\pi}{4}$ | $\frac{VF(1+v)}{2}\left(\frac{(\sqrt{3}P_x - P_y)Q_{max}}{2EI(D-d)} + \frac{M_z}{EJ}\right)$ |
| 5 | π | $\frac{\pi}{4}$ | $\frac{VF(1+v)}{2}\left(\frac{Q_{max}P_y}{EI(D-d)} + \frac{M_z r}{EJ}\right)$ |
| 6 | $\frac{5}{3}\pi$ | $\frac{\pi}{4}$ | $\frac{VF(1+v)}{2}\left(\frac{(-\sqrt{3}P_x - P_y)Q_{max}}{2EI(D-d)} + \frac{M_z r}{EJ}\right)$ |

Although the bridge outputs each contain strains induced by multiple loads, the individual load components can be determined by solving the six coupled equations. This results in the relationship:

$$\begin{bmatrix}P_x\\P_y\\P_z\\M_x\\M_y\\M_z\end{bmatrix} = \frac{1}{3}\begin{bmatrix}0 & 0 & 0 & \sqrt{3}\frac{D-d}{Q_{max}}I & 0 & -\sqrt{3}\frac{D-d}{Q_{max}}I\\0 & 0 & 0 & -\frac{D-d}{Q_{max}}I & 2\frac{D-d}{Q_{max}}I & -\frac{D-d}{Q_{max}}I\\2A & 2A & 2A & 0 & 0 & 0\\0 & 2\sqrt{3}\frac{I}{r} & -2\sqrt{3}\frac{I}{r} & 0 & 0 & 0\\-4\frac{I}{r} & 2\frac{I}{r} & 2\frac{I}{r} & 0 & 0 & 0\\0 & 0 & 0 & \frac{J}{r} & \frac{J}{r} & \frac{J}{r}\end{bmatrix}\begin{bmatrix}\varepsilon_1\\\varepsilon_2\\\varepsilon_3\\\varepsilon_4\\\varepsilon_5\\\varepsilon_6\end{bmatrix} \quad (103)$$

These equations are largely uncoupled due to the specific choice of gauge locations. This condition is not necessary since any calibration of the actual cell will yield the values of the sensitivity matrix without needing to resort to the closed form solution. The closed form derivation is useful to assure that the gauge locations will provide adequate sensitivity to all load components. A poor selection of gauge locations can result in low sensitivity and less accuracy in the load cell. An example of this is where gauges are placed close to each other in both azimuth and gauge angle so that certain loads must be determined by examining a relatively small difference between two large strain readings.

The governing equation for any load cell is based on the elastic strain solution of equation (25):

$$\varepsilon = \left(\frac{M_x r \sin\theta - M_y r \cos\theta}{2EI} + \frac{P_z}{2EA}\right)[(1-v) + (1+v)\cos(2\beta)] + \left(\frac{(P_x \sin\theta - P_y \cos\theta)Q_{max}}{EI(D-d)} + \frac{M_z r}{EJ}\right)(1+v)\sin(2\beta) \quad (25)$$

Introducing a collection of dimensionless load parameters:

$$m_x = \frac{M_x r}{2EI}(1+v) \quad m_y = \frac{M_y r}{2EA}(1+v) \quad \frac{P_z}{2EI}(1+v) \quad C = \frac{1-v}{1+v} \quad (104)$$

$$p_x = \frac{P_x Q_{max}}{EI(D-d)}(1+v) \quad p_y = \frac{P_y Q_{max}}{EI(D-d)}(1+v) \quad m_z = \frac{M_z r}{EJ}(1+v) \quad B = 2\beta$$

simplifies the governing equation to ease manipulation. Now the governing strain equation (equation (25)) becomes:

$$\epsilon = (m_x \sin\theta - m_y \cos\theta + p_z)(C + \cos B) + (p_x \sin\theta - p_y \cos\theta + m_z)\sin B \quad (105)$$

The strain sensitivity is separated by setting gauges at B=0 and B=π/2 so two equations of the form:

$$\Delta V = a_1 \sin\theta + a_2 \cos\theta + a_3$$

result. Then sets of values are determined.

The foregoing description illustrates exemplary implementations, and novel features, of a load cell. There are many aspects to this load cell, because it may involve interaction between numerous components. While some suggestions are provided for alternative uses and implementations of the load cell, it is of course not practical to exhaustively list or describe such alternatives. Accordingly, the scope of the load cell should be determined only by reference to the appended claims, and should not otherwise be limited by features illustrated herein except insofar as such limitation is recited in an appended claim.

While the above description has pointed out novel features of the disclosed load cell, the skilled person will understand that various omissions, substitutions, and changes in the form and details of the load cell illustrated may be made without departing from that described herein.

Each practical and novel combination of the elements described hereinabove, and each practical combination of equivalents to such elements, is contemplated as an embodiment of the load cell. Partly because many more element combinations are contemplated as embodiments than can reasonably be explicitly enumerated herein, the scope of the load cell is properly defined by the appended claims rather than by the foregoing description. Furthermore, any operable possible combination of features described above should be considered as having been expressly and explicitly disclosed herein. All variations coming within the meaning and range of equivalency of the various claim elements are embraced within the scope of the corresponding claim. To this end, each described element in each claim should be construed as broadly as possible.

The invention claimed is:

1. A load cell comprising:
   a body adapted for receiving a load;
   strain gauges mounted upon the body such that there are at least six independent load-strain relations, each gauge producing an output, each gauge mounted at an arbitrary location on the body; and
   processing means in communication with the strain gauge outputs, the processing means including a computer readable medium tangibly embodying at least one set of instructions to decouple load-strain relations.

2. The load cell of claim 1 wherein the computer readable medium tangibly embodying at least one set of instructions to decouple load-strain relations comprises a computer readable medium tangibly embodying at least one set of instructions to generate a decoupling matrix.

3. The load cell of claim 2 wherein the computer readable medium tangibly embodying at least one set of instructions to generate a decoupling matrix comprises a computer readable medium tangibly embodying at least one set of instructions to generate a coefficient matrix by performing a multivariate regression technique on a set of applied loads correlated to the resulting strains.

4. The load cell of claim 3 wherein the computer readable medium tangibly embodying at least one set of instructions to generate a coefficient matrix by performing a multivariate regression technique on a set of applied loads correlated to the resulting strains further comprises a computer readable medium tangibly embodying at least one set of instructions to apply the inverse of the coefficient matrix to a measured strain vector to determine load components.

5. The load cell of claim 1 wherein the strain gauges are configured to achieve temperature compensation.

6. The load cell of claim 5 wherein the strain gauges comprise co-located orthogonal pairs of strain gauges.

7. A method of designing a load cell, the method comprising:
   providing a body adapted for receiving a load;
   mounting a plurality of strain gauges upon the body such that there are at least six independent load-strain relations, each of the plurality of strain gauges mounted at an arbitrary location on the body;
   applying a known load to the body; and
   calibrating the load cell by gathering load-strain data and developing a sensitivity matrix for the load cell.

8. The method of claim 7 further comprising compensating for temperature.

9. The method of claim 8 wherein compensating for temperature comprises co-locating orthogonal pairs of strain gauges.

10. A method of determining load using a load cell, the method comprising:
provide a body adapted for receiving a load;
mounting strain gauges upon the body such that there are at least six independent load-strain relations, each gauge mounted at an arbitrary location on the body;
applying a load to the load cell; and
mathematically decoupling load-strain relations.

11. The method of claim 10 wherein mathematically decoupling load-strain relations comprises applying the inverse of a coefficient matrix to a measured strain vector to determine load components.

12. The method of claim 11 wherein the coefficient matrix comprises a coefficient matrix generated by performing a multivariate regression technique on load-strain relations.

13. The method of claim 10 further comprising compensating for temperature.

14. The method of claim 13 wherein compensating for temperature comprises co-locating orthogonal pairs of strain gauges.

15. A computer readable medium tangibly embodying at least one set of instructions to perform the steps of:
gathering load-strain data from a load cell, the load cell comprising a body adapted for receiving a load, strain gauges mounted upon the body such that there are at least six independent load-strain relations, each gauge producing an output, each gauge mounted at an arbitrary location on the body; and
developing a load-strain sensitivity matrix for the load cell.

16. The computer readable medium of claim 15 further comprising at least one set of instructions to perform the step of determining a load applied to the load cell by applying the inverse of the load-strain sensitivity matrix to a measured strain vector.

17. The computer readable medium of claim 15 wherein the load-strain sensitivity matrix comprises a coefficient matrix generated by performing a multivariate regression technique on a set of applied loads correlated to resulting strains.

* * * * *